United States Patent [19]
Mabry et al.

[11] Patent Number: 6,040,364
[45] Date of Patent: Mar. 21, 2000

[54] METHODS FOR PRODUCING ELASTOMERIC COMPOSITIONS

[75] Inventors: Melinda Ann Mabry, Newton; Frederick Harry Rumpf, Billerica, both of Mass.; Ivan Zlatko Podobnik, Nashua, N.H.; Scott Adrian Westveer, Westord; Allan Clark Morgan, Manchester, both of Mass.; Bin Chung, Nashua, N.H.; Malcolm John Andrews, Bryan, Tex.

[73] Assignee: Cabot Corporation, Boston, Mass.

[21] Appl. No.: 08/969,713

[22] Filed: Nov. 17, 1997

Related U.S. Application Data

[63] Continuation of application No. 08/625,163, Apr. 1, 1996, abandoned.

[51] Int. Cl.$^7$ .................................................. C08K 3/00
[52] U.S. Cl. ..................... 523/318; 523/324; 524/495; 524/496
[58] Field of Search .................... 523/318, 324; 524/495, 496

[56] References Cited

U.S. PATENT DOCUMENTS

| | | |
|---|---|---|
| 1,611,278 | 12/1926 | Petersen . |
| 1,846,820 | 2/1932 | Darling et al. . |

(List continued on next page.)

FOREIGN PATENT DOCUMENTS

| | | |
|---|---|---|
| 0 051 450 | 5/1982 | European Pat. Off. . |
| 0 287 392 A3 | 10/1988 | European Pat. Off. . |
| 0 570 715 A1 | 11/1993 | European Pat. Off. . |
| 620250A1 | 3/1994 | European Pat. Off. . |
| 0 763 558 A1 | 3/1997 | European Pat. Off. . |
| 1 063 364 | 8/1959 | Germany . |
| 1063364 | 8/1959 | Germany . |
| 1 620 918 | 9/1965 | Germany . |
| 1620918 | 3/1972 | Germany . |
| 581 493 | 6/1974 | Switzerland . |
| 581 493 | 11/1976 | Switzerland . |
| 705344 | 3/1954 | United Kingdom . |

OTHER PUBLICATIONS

European Search Report, International Application No. PCT/US97/05276, 2 pages with attached Patent Family Annex, 2 pages.

Patent Abstracts of Japan, vol. 006, No. 126 (M–142), Jul. 10, 1982 & JP 57 053340A (Bridgestone Corp.), Mar. 30, 1982.

(List continued on next page.)

*Primary Examiner*—Edward J. Cain

[57] ABSTRACT

Elastomeric compositions are produced by novel continuous flow methods and apparatus in which fluid streams of particulate filler and elastomer latex are fed to the mixing zone of a coagulum reactor to form a mixture flowing continuously from the mixing zone through a coagulum zone to a discharge end of the reactor. The particulate filler fluid is fed under high pressure to the mixing zone, such as to form a jet stream to entrain elastomer latex fluid sufficiently energetically to substantially completely coagulate the elastomer with the particulate filler prior to the discharge end. Semi-confined flow of the mixture in the coagulum zone is achieved preferably with progressively increasing cross-sectional dimension of the coagulum zone from the mixing zone to the discharge end. Highly efficient and effective elastomer coagulation can be achieved without the need for a coagulation step involving exposure to acid or salt solution or the like. In addition to elastomeric compositions comparable to those achievable using traditional acid or salt coagulation techniques, novel elastomeric compositions can be prepared employing previously unworkable fillers, such as carbon black of exceptionally high surface area and low structure, etc., and/or having heretofore unachievable performance properties, filler dispersion levels, elastomer molecular weight distribution or a combination of any of these.

30 Claims, 6 Drawing Sheets

U.S. PATENT DOCUMENTS

| | | | |
|---|---|---|---|
| 2,769,795 | 11/1956 | Braendle | 260/41.5 |
| 3,048,559 | 8/1962 | Heller et al. | 260/336 |
| 3,108,982 | 10/1963 | Barclay | 260/33.6 |
| 3,335,200 | 8/1967 | Thorn | 260/746 |
| 3,403,121 | 9/1968 | Hare . | |
| 3,767,605 | 10/1973 | Gerlicher . | |
| 3,887,532 | 6/1975 | Neubert | 260/85.1 |
| 4,025,711 | 5/1977 | Davidson et al. | 528/488 |
| 4,029,633 | 6/1977 | Hagopian et al. | 260/42.55 |
| 4,103,074 | 7/1978 | Hertel et al. | 528/487 |
| 4,124,550 | 11/1978 | Kobayashi et al. | 260/23.3 |
| 4,265,939 | 5/1981 | Tebbens et al. . | |
| 4,302,377 | 11/1981 | Gurak et al. | 260/29.7 PT |
| 4,303,569 | 12/1981 | Güurak et al. . | |
| 4,375,497 | 3/1983 | Sandstrom | 428/407 |
| 4,446,309 | 5/1984 | Jiroumaru et al. | 528/486 |
| 4,456,381 | 6/1984 | Inoue et al. . | |
| 4,718,771 | 1/1988 | Asai et al. . | |
| 4,744,744 | 5/1988 | Sugimori et al. . | |
| 4,914,186 | 4/1990 | Miss et al. . | |
| 4,917,211 | 4/1990 | Yamada et al. . | |
| 4,917,501 | 4/1990 | Simonet et al. . | |
| 5,047,287 | 9/1991 | Horiuchi et al. | 428/248 |
| 5,119,927 | 6/1992 | Brüggemann . | |
| 5,205,972 | 4/1993 | Kafka . | |
| 5,227,425 | 7/1993 | Rauline | 524/493 |
| 5,264,290 | 11/1993 | Touchet et al. . | |
| 5,328,949 | 7/1994 | Sandstrom et al. | 524/262 |
| 5,430,088 | 7/1995 | Ohashi et al. | 524/496 |
| 5,516,833 | 5/1996 | Ohashi et al. | 524/495 |
| 5,558,316 | 9/1996 | Lee et al. . | |
| 5,599,868 | 2/1997 | Bohm et al. | 524/495 |
| 5,639,817 | 6/1997 | Probst et al. | 524/496 |
| 5,658,657 | 8/1997 | Tomizawa et al. | 428/323 |

OTHER PUBLICATIONS

Database WPI, Week 9345, Derwent Publications, Ltd. London, GB, AN 93–357278, XP002036310 & JP 05 262 918A (Yokohama Rubber Co., Ltd, Oct. 12, 1993.

Patent Abstract of Japan, vol. 006, No. 126 (M–142) JP 57 053340 (Bridgestone Corp.), Mar. 30, 1982.

Database WPI, Week 9345, Derwent Publications, Ltd., London, GB, AN 93–357278, XP002036310 & JP 05 262 918A (Yokohama Rubber Co., Ltd.), Oct. 12, 1993.

Communication Relating to the Results of the Partial International Search, International Application No. PCT/US 97/05276, 2 pages with attached Patent Family Annex, 2 pages.

Written Opinion for PCT/US 97/05276, date of mailing Jan. 13, 1998.

Natural Rubber Carbon Black Masterbatches from Field Latex by Shukri Bin Abdul Wahab, K.P. NG, Kamarul Baharain Bin Basir and W.P. Chang, Rubber Research Institute of Malaysia, Kuala Lumpur, Malaysia, pp. 29–41, Proceedings of NR Technology Seminar, Dec. 1978.

Functionalization of Elastomers by Reactive Mixing by The Malaysian Rubber Producers' Research Association, the Common Fund for Commodities, pp. 308–312, Research Disclosure, Jun. 1994.

METHODS FOR PRODUCING ELASTOMERIC COMPOSITIONS

This application is a continuation of application Ser. No. 08/525,163, filed Apr. 1, 1996 now abandoned.

FIELD OF THE INVENTION

The present invention is directed to novel methods and apparatus for producing elastomeric compositions, and to novel elastomeric compositions produced using such methods and apparatus. More particularly, the invention is directed to continuous flow methods and apparatus for producing elastomer masterbatch of particulate filler finely dispersed in elastomer.

BACKGROUND

Numerous products of commercial significance are formed of elastomeric compositions wherein particulate filler is dispersed in any of various synthetic elastomers, natural rubber or elastomer blends. Such products include, for example, vehicle tires wherein different elastomeric compositions may be used for the tread portion, side walls, wire skim and carcass. Other products include, for example, engine mount bushings, conveyor belts, windshield wipers and the like. It is well known that the performance properties of an elastomeric composition depend upon the elastomer or elastomer blend used in the composition, as well as the choice of particulate filler, additives and the method by which the composition is formed. While a wide range of performance characteristics can be achieved employing currently available materials and manufacturing techniques, there has been a long standing need in the industry to develop elastomeric compositions having improved formulations and properties and to reduce the cost and complexity of current manufacturing techniques. In particular, it is known for example that the macro-dispersion levels, that is, the uniformity of dispersion of particulate filler within an elastomer, can significantly impact performance characteristics. For elastomeric compositions prepared by intensively mixing the particulate filler with the elastomer, improved dispersion may require longer or more intensive mixing, with the consequent disadvantages of increased energy costs, manufacturing time, etc. In addition, particularly in the case of natural rubber, prolonged or more intensive mixing will degrade the elastomer by reducing its molecular weight, rendering the finished elastomeric compound undesirable for certain applications.

Carbon black is widely used as a reinforcing agent for natural rubber and other elastomers. It is common to produce a premixture of carbon black and elastomer, and various optical additives, such as extender oil, commonly referred to as masterbatch. Carbon black masterbatch is prepared with different grades of commercially available carbon black which vary both in surface area per unit weight and in "structure." It is well known to employ carbon blacks having higher or lower structure and surface area to manipulate the performance characteristics of an elastomeric composition. Carbon blacks of higher surface area and lower structure are known to improve abrasion and/or hysterisis properties, for example. It is difficult to achieve excellent uniformity of dispersion of extremely high surface area, low structure carbon blacks throughout the elastomer, however, without unacceptable degradation of the elastomer. In the highly energy consumptive intensive dry mixing methods mentioned above, the mastication of the elastomer necessary for dispersing the carbon black results in unacceptable levels of disruption of the polymeric chains of the elastomer. The resultant reduction in the molecular weight of the elastomer is undesirable for many industrial applications. For use in tire tread, for example, reduced elastomer molecular weight is known to cause an undesirable increase in the so-called rolling resistance of the tire.

Furthermore, while theoretical analysis has indicated desirable improvements in certain performance characteristics of carbon black masterbatch employing carbon blacks of higher surface area and lower structure, it has not been possible using known physical milling or other mastication processes to obtain such elastomeric compositions in which both the molecular weight distribution of the elastomer is preserved and satisfactory macro-dispersion levels are achieved. Generally, it has been found, for example, that the elastomer reinforcing properties of a carbon black increase as the particle size of the carbon black decreases. However, with extremely fine carbon blacks an anomalous condition is known to be encountered, in which the expected improvement in properties is not achieved. This is understood to be due at least in part to the inability of conventional elastomer compounding methods to adequately disperse the carbon black in the elastomer without undue breakdown of the elastomer polymer. There is consequent failure to take full advantage of the natural affinity of the carbon black and the elastomer for each other.

In addition to the dry mixing techniques described above, it also is conventional in synthetic elastomer latex masterbatching to continuously feed the latex and a carbon black slurry to an agitated coagulation tank. The coagulation tank contains a coagulant such as an aqueous acid and salt solution, typically having a pH of about 2.5 to 4. The latex and carbon black slurry are mixed and coagulated in the coagulation tank into small beads (typically a few millimeters in diameter) referred to as wet crumb. The crumb and acid effluent are separated, typically by means of a vibrating shaker screen or the like. The crumb is then dumped into a second agitated tank where it is washed to achieve a neutral or near neutral pH. Thereafter the crumb is subjected to additional vibrating screen and drying steps and the like.

Such methods present the disadvantage of a waste stream of used coagulant and the need to thoroughly wash the product crumb to remove acid, salt, uncoagulated latex and carbon black, etc. Such effluent streams cause both undesirable cost and manufacturing process complexity. There has, accordingly, been a long-standing need in the industry to reduce or eliminate such effluent streams.

Variations on this method have been suggested for the coagulation of natural and synthetic elastomers. In prior U.S. Pat. No. 4,029,633 to Hagopian et al, which like the present invention is assigned to Cabot Corporation, a continuous process for the preparation of elastomer masterbatch is suggested. An aqueous slurry of carbon black is prepared and mixed with a natural or synthetic elastomer latex. This mixture undergoes a so-called creaming operation, optionally using any of various known creaming agents. Following the creaming of the carbon black/latex mixture, it is subjected to a coagulation step. Specifically, the creamed carbon black/latex mixture is introduced as a single coherent stream into the core of a stream of coagulating liquor. The solid stream of creamed carbon black/latex mixture is said to undergo shearing and atomizing by the stream of coagulating liquor prior to coagulation, being then passed to a suitable reaction zone for completion of the coagulation. Following such coagulation step, the remainder of the process is substantially conventional, involving separation of the crumb from the waste product "serum" and washing and drying of the crumb. A somewhat similar process is suggested in U.S. Pat. No. 3,048,559 to Heller et al. An aqueous slurry of carbon black is continuously blended with a stream of natural or synthetic elastomer or latex. The two streams are mixed under conditions described as involving violent hydraulic turbulence and impact. As in the case of the Hagopian et al patent mentioned above, the combined stream of carbon black slurry and elastomer latex is subsequently coagulated by the addition of an acid or salt coagulant solution.

It is an object of the present invention to provide methods and apparatus for producing elastomeric compositions. In accordance with various preferred embodiments of the invention, it is a particular object to reduce or even eliminate some of the long standing disadvantages involved in conventional techniques used in the production of elastomer masterbatch. In particular, certain preferred embodiments have as an object the production of conventional elastomer masterbatch with significant reduction of the cost and complexity of the manufacturing process. Other preferred embodiments have as an object the production of novel elastomeric compositions having, in combination, desirable particulate loading levels and dispersion levels, better preservation of elastomeric molecular weight, use of high surface area, low structure carbon black or other particulate filler and/or other features not heretofore achievable using conventional production techniques. Additional objects and aspects of the present invention will be further understood from the following disclosure and detailed discussion.

SUMMARY OF THE INVENTION

In accordance with a first aspect, a method for preparing elastomer masterbatch involves feeding simultaneously a particulate filler fluid and an elastomer latex fluid to a mixing zone of a coagulum reactor. A coagulum zone extends from the mixing zone, preferably progressively increasing in cross-sectional area in the downstream direction from an entry end to a discharge end. The elastomer latex may be either natural or synthetic and the particulate filler fluid comprises carbon black or other particulate filler effective to coagulate the latex. The particulate filler fluid is fed to the mixing zone preferably as a continuous, high velocity jet of injected fluid, while the latex fluid is fed at low velocity. The velocity, flow rate and particulate concentration of the particulate filler fluid are sufficient to cause mixture with high shear of the latex fluid and flow turbulence of the mixture within at least an upstream portion of the coagulum zone so as to substantially completely coagulate the elastomer latex with the particulate filler prior to the discharge end. Substantially complete coagulation can thus be achieved, in accordance with preferred embodiments, without the need of employing an acid or salt coagulation agent.

In accordance with another aspect, a continuous flow method of producing elastomer masterbatch comprises the continuous and simultaneous feeding of latex fluid and particulate filler fluid to the mixing zone of the coagulum reactor establishes a continuous, semi-confined flow of a mixture of the elastomer latex and particulate filler in the coagulum zone. Elastomer masterbatch crumb in the form of "worms" or globules are discharged from the discharge end of the coagulum reactor as a substantially constant flow concurrently with the on-going feeding of the latex and particulate filler fluid streams into the mixing zone of the coagulum reactor. Notably, the plug-type flow and atmospheric or near atmospheric pressure conditions at the discharge end of the coagulum reactor are highly advantageous in facilitating control and collection of the elastomer masterbatch product, such as for immediate or subsequent further processing steps.

In accordance with an apparatus aspect, means are provided for feeding elastomer latex fluid continuously to the mixing zone of the aforesaid coagulum reactor, preferably under low pressure, substantially laminar type flow conditions, and means are provided for simultaneously feeding particulate filler fluid continuously to the mixing zone under pressure sufficient to create a jet of sufficient velocity or kinetic energy to entrain the elastomer latex as described above, and achieve coagulation before the mixture flowing downstream from the mixing zone reaches the discharge end of the coagulum reactor. In accordance with certain preferred embodiments described in detail below, means for feeding the elastomer latex fluid and separate means for feeding the particulate filler fluid each may comprise a feed channel in a mix head integral with a substantially tubular member defining the coagulum zone. The mixing zone may be provided at the junction of such feed channels within the mix head. In accordance with certain preferred embodiments, the mixing zone is simply a coaxial extension of the coagulum zone. Progressive increase in the cross-sectional area of the coagulum reactor is continuous in certain preferred embodiments and is stepwise in other preferred embodiments. Additionally, the coagulum reactor may be provided with such optional features as a diverter at its discharge end, as further described below. Additional optional and preferred features of the apparatus disclosed here for continuous flow production of elastomer masterbatch are discussed in the detailed description below.

In accordance with yet another aspect, elastomeric compositions are provided as a product of the process or apparatus disclosed above. Furthermore, novel elastomeric compositions are provided in which there is a novel and unique, heretofore unobtainable combination of properties, including macro-dispersion level of the particulate filler, molecular weight distribution of the elastomer, particulate loading level, choice of particulate filler (including carbon black fillers of exceptionally high surface area and low structure) and/or other characteristics. In that regard, the methods and apparatus disclosed here can achieve excellent dispersion, even of certain fillers, such as carbon blacks having a structure to surface area ratio DBP: $I_2$No less than 1.2 and even less than 1, in elastomers such as natural rubber, with little or no degradation of the molecular weight of the elastomer. Prior known dry mastication techniques could not achieve equal dispersion of such fillers without significant molecular weight degradation and, therefore, could not produce the novel natural rubber masterbatch compositions made in accordance with certain preferred embodiments of the present invention. In accordance with yet other aspects of the invention, intermediate products are provided as well as final products which are formed of the elastomeric compositions produced by the method or apparatus disclosed here.

It will be recognized by those skilled in the art, that is, by those who are knowledgeable or experienced in this area of technology, that the present invention represents a most important and commercially significant technological advance. By virtue of the method and apparatus disclosed here, elastomer masterbatch can be produced in a continuous flow process involving mixture of elastomer latex and particulate filler fluids at turbulence levels and flow control conditions sufficient to achieve coagulation even without use of traditional coagulating agents. In fact, it will be immediately recognized to be of great commercial benefit that elastomer masterbatch crumb is achieved, that is, coagulated latex is achieved, without the need for either intensive dry mastication of elastomer with filler or exposing a latex/particulate composition to a stream or tank of coagulant. Thus, in routine commercial implementation the cost and complexity of employing acid coagulation solutions can be avoided. Prior techniques involving premixing of latex and particulate, such as in the above-mentioned Heller et al patent and Hagopian et al patent failed to achieve or even recognize the possibility of achieving coagulation without exposing the latex/particulate mixture to the usual coagulant solution with its attendant cost and waste disposal disadvantages.

Feed rates of latex fluid and particulate filler fluid to the mixing zone of the coagulum reactor can be precisely metered to achieve high yield rates, with little free latex and little undispersed filler in the product crumb at the discharge end of the coagulum reactor. Without wishing to be bound by theory, it presently is understood that a quasi-mono-phase system is established in the mixing zone except that coagulum solids are being formed there and/or downstream thereof in the coagulum zone. Extremely high feed velocity of the particulate filler fluid into the mixing zone of the coagulum reactor and velocity differential relative the latex fluid feed are believed to be significant in achieving sufficient turbulence, i.e., sufficiently energetic shear of the latex by the impact of the particulate filler fluid jet for thorough mixing and dispersion of the particulate into the latex fluid and coagulation. High mixing energies yield product masterbatch crumb with excellent dispersion, together with controlled product delivery. The coagulum is created and then formed into a desirable extrudate.

These and other aspects and advantages of various embodiments of the invention will be further understood in view of the following detailed discussion of certain preferred embodiments.

BRIEF DESCRIPTION OF THE DRAWINGS

The following discussion of certain preferred embodiments will make reference to the appended drawings wherein.

Figure 1:
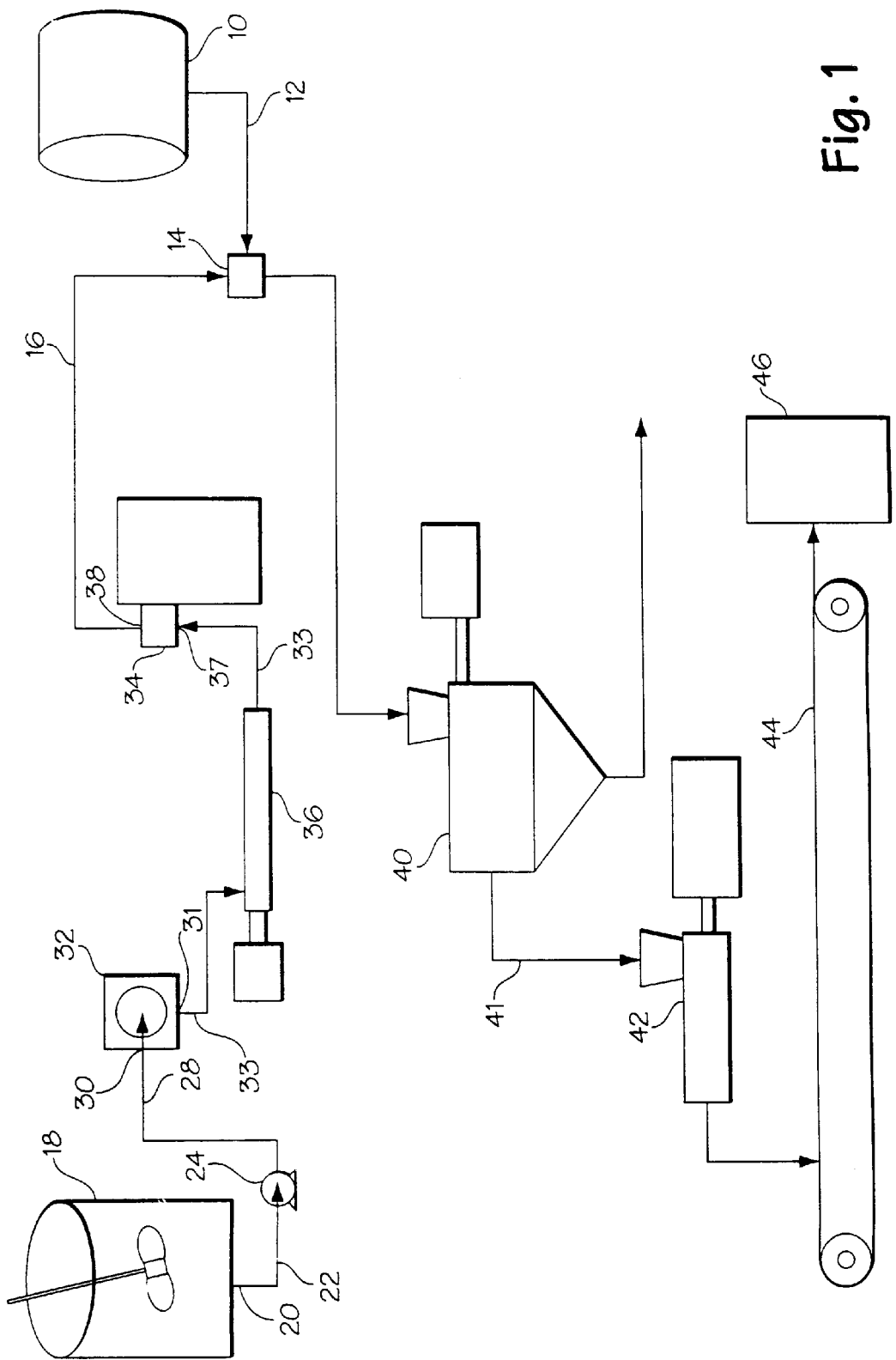
FIG. 1 is a schematic flow chart illustration of the apparatus and method for preparing elastomer masterbatch in accordance with certain preferred embodiments.

It should be understood that the appended drawings are not necessarily precisely to scale. Certain features may have been enlarged or reduced for convenience or clarity of illustration. Directional references used in the following discussion are based on the orientation of components illustrated in the drawings unless otherwise stated or otherwise clear from the context. In general, apparatus in accordance with different embodiments of the invention can be employed in various orientations. It will be within the ability of those skilled in the art, given the benefit of the present disclosure, to determine appropriate dimensions and orientations for apparatus of the invention employing routine technical skills and taking into account well-known factors particular to the intended application, such as desired production volumes, material selection, duty cycle, and the like. Reference numbers used in one drawing are used in all other drawings for the same feature or element.

DETAILED DESCRIPTION OF CERTAIN PREFERRED EMBODIMENTS

Certain preferred embodiments are discussed below, of the method and apparatus disclosed above for producing elastomer masterbatch. More specifically, embodiments are discussed in conjunction with the appended drawings, wherein a continuous flow method of producing elastomer masterbatch employs a continuous, semi-confined flow of mixed elastomer latex and particulate filler in a coagulum reactor forming an elongate coagulum zone which extends with progressively increasing cross-sectional area from an entry end to a discharge end. The term "semi-confined" flow refers to a highly advantageous feature of the preferred embodiments. As used here the term is intended to mean that the flow path followed by the mixed latex fluid and particulate filler fluid within the coagulum reactor is closed or substantially closed upstream of the mixing zone and is open at the opposite, downstream end of the coagulum reactor, that is, at the discharge end of the coagulum reactor. Turbulence conditions in the upstream portion of the coagulum zone are maintained in on-going, at least quasi-steady state fashion concurrently with substantially plug flow-type conditions at an open discharge end of the coagulum reactor. The discharge end is "open" in the sense it permits discharge of coagulum, generally at or near atmospheric pressure and, typically, by simple gravity drop (optionally within a shrouded or screened flow path) into suitable collection means, such as the feed hopper of a de-watering extruder. Thus, the semi-confined flow results in a turbulence gradient extending axially or longitudinally within at least a portion of the coagulum reactor. Without wishing to be bound by theory, it presently is understood that the coagulum zone is significant in permitting high turbulence mixing and coagulation in an upstream portion of the coagulum reactor, together with substantially plug-type product discharge flow at the discharge end. In fact, injection of the particulate filler fluid or "slurry" as a continuous jet into the mixing zone occurs in on-going fashion simultaneously with ease of collection of the elastomer masterbatch crumb discharged under plug-type flow conditions and ambient pressure at the discharge end of the coagulum reactor. Similarly, axial velocities at the slurry nozzle and, typically, at the upstream end of the coagulum zone are substantially higher than at the discharge end. Axial velocity of the particulate filler fluid will typically be several hundred feet per second as it enters the mixing zone, preferably from a small bore, axially oriented feed tube in accordance with preferred embodiments discussed below. The axial velocity of the resultant flow at the entry end of a coagulum reactor with expanding cross-sectional area in a typical application may be, for example, 5 to 20 feet per second, and more usually 7 to 15 feet per second. At the discharge end, in contrast again, axial velocity of the masterbatch crumb product being discharged there will in a typical application be approximately 1 to 10 feet per second, and more generally 2 to 5 feet per second. Thus, the semi-confined turbulent flow of the method and apparatus disclosed here achieves the highly significant advantage that elastomer latex is coagulated by mixture with particulate filler even in the absence of subsequent treatment in a stream or tank of acid or other coagulant solution, with controlled, preferably quasi-molded product delivery from the coagulum reactor for subsequent processing.

It should be understood in this regard that reference to the coagulum reactor as being "open" at the discharge end is not intended to mean that the discharge end is necessarily exposed to view or easily accessed by hand. It may instead be permanently or releasably attached to a collection device or subsequent processing device, such as a diverter (discussed further below), dryer, etc. The discharge end of the coagulum reactor is open in the important sense that the turbulent flow within the coagulum zone of the coagulum reactor, which is under high pressure and sealed against any significant rearward (i.e., upstream) travel at the mixing zone, is permitted to establish the aforesaid pressure gradient down to atmospheric or near atmospheric pressure as it travels toward and freely exits from the discharge end.

It should also be recognized in this regard that the turbulence of the flow lessens along the coagulum reactor toward the discharge end. Typically, substantially plug flow is achieved prior to the discharge end, dependent upon such factors as percent of capacity utilization, selection of materials and the like. Reference here to the flow being substantially plug flow at or before the discharge end of the coagulum reactor should be understood in light of the fact that the flow at the discharge end is composed primarily or entirely of masterbatch crumb, that is, globules or "worms" of coagulated elastomer masterbatch. The crumb is typically quasi-molded to the inside shape of the coagulum zone at the point along the coagulum zone at which flow became plug flow. The ever-advancing mass of "worms" or globules advantageously have plug-type flow in the sense that they are traveling generally or primarily axially through the elongate coagulum zone and at any point in time in a given cross-section of the coagulum zone near the discharge end have a fairly uniform velocity, such that they are readily collected and controlled for further processing. Thus, the fluid phase mixing aspect disclosed here can advantageously be carried out at steady state or quasi-steady state conditions in accordance with preferred embodiments, resulting in high levels of product uniformity.

A preferred embodiment of the method and apparatus disclosed here is illustrated schematically in FIG. 1. Those skilled in the art will recognize that the various aspects of system configuration, component selection and the like will depend to some extent on the particular characteristics of the intended application. Thus, for example, such factors as maximum system through-put capacity and material selection flexibility will influence the size and layout of system components. In general, such considerations will be well within the ability of those skilled in the art given the benefit of the present disclosure. The system illustrated in FIG. 1 is seen to include means for feeding elastomer latex fluid at low pressure and low velocity continuously to a mixing zone of a coagulum reactor. More particularly, a latex pressure tank 10 is shown, to hold the feed supply of latex under pressure. Alternatively, a latex storage tank can be used, equipped with a peristaltic pump or series of pumps or other suitable feed means adapted to hold elastomer latex fluid to be fed via feed line 12 to a mixing zone of a coagulum reactor 14. Latex fluid in tank 10 may be held under air or nitrogen pressure or the like, such that the latex fluid is fed to the mixing zone at a line pressure of preferably less than 10 psig, more preferably about 2–8 psig, and typically about 5 psig. The latex feed pressure and the flow lines, connections, etc., of the latex feed means should be arranged to cause shear in the flowing latex fluid as low as reasonably possible. Preferably all flow lines, for example, are smooth, with only large radius turns, if any, and smooth line-to-line interconnections. Typically, the pressure is selected to yield a flow velocity into the mixing zone of less than about 12 feet per second, preferably about 3 to 12 feet per second, e.g., about 5 feet per second.

Suitable elastomer latex fluids include both natural and synthetic elastomer latices and latex blends. Suitable natural rubber latices include both field latex and latex concentrate. The latex must, of course, be suitable for coagulation by the selected particulate filler. Such elastomers include, but are not limited to, homo- or co-polymers of 1,3-butadiene, styrene, isoprene, isobutylene, 2,3-dimethyl-1,3-butadiene, acrylonitrile, ethylene, and propylene. The elastomer may have a glass transition temperature (Tg) as measured by differential scanning calorimetry (DSC) ranging from about $-120°$ C. to about $0°$ C. Examples include, but are not limited to, styrene-butadiene including SBR, natural rubber, polybutadiene, and polyisoprene. Blends of any of the foregoing may also be used. The latex may be in an aqueous carrier liquid. Alternatively, the liquid carrier may be a hydrocarbon solvent. In any event, the elastomer latex fluid must be suitable for controlled continuous feed at appropriate velocity, pressure and concentration into the mixing zone. In accordance with certain preferred embodiments, the elastomer latex is a natural rubber latex, being either field latex or latex concentrate (produced, for example, by evaporation, centrifugation or creaming) fed to the mixing zone at a pressure of about 5 psig, at a feed velocity in the range of about 3–12 ft. per second, more preferably about 4–6 ft. per second. The well known instability of natural rubber latex is advantageously accommodated, in that it is subjected to relatively low pressure and low shear throughout the system until it is entrained into the aforesaid semi-confined turbulent flow upon encountering the extraordinarily high velocity and kinetic energy of the particulate filler fluid in the mixing zone. Numerous suitable alternative latices are commercially available and are known to those skilled in the art. Selection of a suitable latex or blend of latices will be well within the ability of those skilled in the art given the benefit of the present disclosure and the knowledge of selection criteria generally well recognized in the industry.

The particulate filler fluid is fed to the mixing zone at the entry end of coagulum reactor 14 via feed line 16. The particulate filler fluid may comprise any suitable filler in a suitable carrier fluid. Selection of the carrier fluid will depend largely upon the choice of particulate filler and upon system parameters. Both aqueous and non-aqueous liquids may be used, with water being preferred in many embodiments in view of its cost, availability and suitability of use in the production of particulate filler slurries. Highly preferred for use in the particulate filler fluids employed in producing elastomer masterbatch in accordance with the methods and apparatus disclosed here, are carbon black, fumed silica, precipitated silica and silicon-treated carbon black, either alone or in combination with each other. In silicon-treated carbon black, a silicon containing species such as an oxide or carbide of silicon, is distributed through at least a portion of the carbon black aggregate as an intrinsic part of the carbon black. At least one silicon-containing region is present either at the surface of or within the carbon black aggregate. Such silicon-treated carbon blacks may be obtained by manufacturing carbon black in the presence of volatizable silicon-containing compounds. Such carbon blacks are preferably produced in a modular or "staged" furnace carbon black reactor having a combustion zone followed by a zone of converging diameter, a feed stock injection zone with restricted diameter, and a reaction zone. A quench zone is located downstream of the reaction zone. Typically, a quenching fluid, generally water, is sprayed into the stream of newly formed carbon black particles flowing from the reaction zone. In producing silicon-treated carbon black, the aforesaid volatizable silicon-containing compound is introduced into the carbon black reactor at a point upstream of the quench zone. Useful compounds are volatizable compounds at carbon black reactor temperatures. Examples include, but are not limited to, silicates such as tetraethoxy orthosilicate (TEDS) and tetramethoxy orthosilicate, silanes such as, tetrachloro silane, and trichloro methylsilane; and colatile silicone polymers such as octamethylcyclotetrasiloxane (OMTS). The flow rate of the volatilizable compound will determine the weight percent of silicon in the treated carbon black. The weight percent of silicon in the treated carbon black typically should range from about 0.1 percent to 25 percent, preferably about 0.5 percent to about 10 percent, and more preferably about 2 percent to about 6 percent. The volatizable compound may be pre-mixed with the carbon black-forming feed stock and introduced with the feed stock into the reaction zone. Alternatively, the volatizable compound may be introduced to the reaction zone separately, either upstream or downstream from the feed stock injection point. As noted above, additives may be used, and in this regard coupling agents useful for coupling silica or carbon black should be expected to be useful with the silicon-treated carbon blacks. Carbon blacks and numerous additional suitable particulate fillers are commercially available and are known to those skilled in the art.

Selection of the particulate filler or mixture of particulate fillers will depend largely upon the intended use of the elastomer masterbatch product. As used here, particulate filler can include any material which can be slurried and fed to the mixing zone in accordance with the principles disclosed here. Suitable particulate fillers include, for example, conductive fillers, reinforcing fillers, fillers comprising short fibers (typically having an L/D aspect ratio less than 40), flakes, etc. In addition to the carbon black and silica-type fillers mentioned above, fillers can be formed of clay, glass, polymer, such as aramid fiber, etc. It will be within the ability of those skilled in the art to select suitable particulate fillers for use in the method and apparatus disclosed here given the benefit of the present disclosure and known selection criteria.

Preferred embodiments of the invention consistent with FIG. 1 are especially well adapted to preparation of particulate filler fluid comprising aqueous slurries of carbon black. In accordance with known principles, it will be understood that carbon blacks having lower surface area per unit weight must be used in higher concentration in the particulate slurry to achieve the same coagulation efficacy as lower concentrations of carbon black having higher surface area per unit weight. Agitated mixing tank 18 receives water and optionally pelletized carbon black to prepare an initial mixture fluid. Such mixture fluid passes through discharge port 20 into fluid line 22 equipped with pumping means 24, such as a diaphragm pump or the like. Line 28 passes the mixture fluid to colloid mill 32 through intake port 30. The carbon black is dispersed in the aqueous carrier liquid to form a dispersion fluid which is passed through outlet port 31 and fluid line 33 to a homogenizer 34. Pumping means 36, preferably comprising a progressing cavity pump or the like is provided in line 33. Homogenizer 34 more finely disperses the carbon black in the carrier liquid to form the carbon black slurry which is fed to the mixing zone of the coagulum reactor 14. It has an inlet port 37 in fluid communication with line 33 from the colloid mill 32. The homogenizer 34 may comprise, for example, a Microfluidizer® system commercially available from Microfluidics International Corporation (Newton, Mass., USA). Also suitable are homogenizers such as models MS18, MS45 and MC120 Series homogenizers available from the APV Homogenizer Division of APV Gaulin, Inc. (Wilmington, Mass., USA). Other suitable homogenizers are commercially available and will be apparent to those skilled in the art given the benefit of the present disclosure. Typically, carbon black in water prepared in accordance with the above described system will have at least about 90% agglomerates less than about 30 microns, more preferably at least about 90% of agglomerates less than about 20 microns in size. Exit port 38 passes the carbon black slurry from the homogenizer to the mixing zone through feed line 16.

The slurry preferably is used in masterbatch production immediately upon being prepared. Fluid conduits carrying the slurry and any optional holding tanks and the like, should establish or maintain conditions which substantially preserve the dispersion of the carbon black (and/or other filler) in the slurry. That is, substantial reagglomeration or setting out of the particulate filler in the slurry should be prevented or reduced to the extent reasonably practical. Preferably all flow lines, for example, are smooth, with smooth line-to-line interconnections.

Elastomer latex fluid passed to the mixing zone via feed line 12 and particulate filler fluid fed to the mixing zone via feed line 16 produce elastomer masterbatch crumb in accordance with the principles discussed above. Means may also be provided for incorporating various additives into the elastomer masterbatch. An additive fluid comprising one or more additives may be fed to the mixing zone as a separate feed stream. One or more additives also may be pre-mixed, if suitable, with the particulate filler fluid or, more typically, with the elastomer latex fluid. Numerous additives are well known to those skilled in the art and include, for example, antioxidants, antiozonants, plasticizers, processing aids (e.g., liquid polymers, oils and the like), resins, flame-retardants, extender oils, lubricants, and a mixture of any of them. The use and selection of such additives is well known to those skilled in the art. Their use in the system disclosed here will be readily understood with the benefit of the present disclosure. The mixing zone/coagulum zone assembly is discussed in more detail below. The elastomer masterbatch crumb is passed from the discharge end of coagulum reactor 14 to suitable drying apparatus. In the preferred embodiment of FIG. 1 the masterbatch crumb undergoes multi-stage drying. It is passed first to a de-watering extruder 40 and then via conveyor or simple gravity drop or other suitable means 41 to a drying extruder 42. In routine preferred embodiments consistent with that illustrated in FIG. 1 producing natural rubber masterbatch with carbon black filler, the de-watering/drying operation will typically reduce water content to about 0 to 1 weight percent, more preferably 0.0 to 0.5 weight percent. Suitable dryers are well known and commercially available, including for example, extruder dryers, fluid bed dryers, hot air or other oven dryers, and the like, such as French Mills available from the French Oil Machinery Co., (Piqua, Ohio, USA).

Dried masterbatch crumb from drying extruder 42 is carries by a cooling conveyor 44 to a baler 46. The baler is an optional, advantageous feature of the preferred embodiment of FIG. 1, wherein the dried masterbatch crumb is compressed within a chamber into form-stable blocks or the like. Typically, 25 to 75 pound quantities of the elastomer masterbatch are compressed into blocks or bales for transport, further processing, etc.

Figure 2:
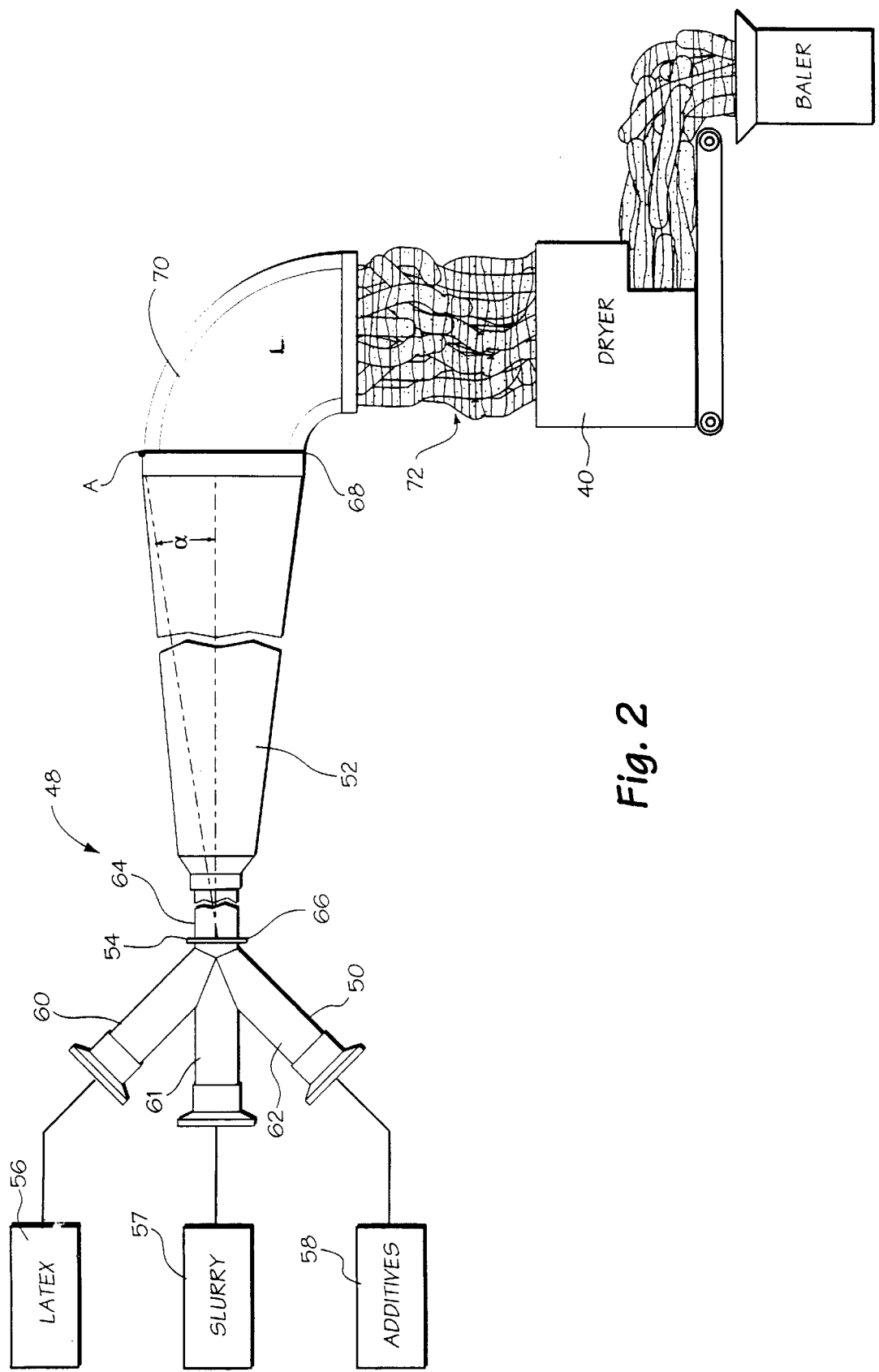
FIG. 2 is an elevation view, partly schematic, of a preferred embodiment consistent with the schematic flow chart illustration of FIG. 1.

The dimensions and particular design features of the coagulum reactor 14, including the mixing zone/coagulum zone assembly, suitable for an embodiment in accordance with FIG. 1, will depend in part on such design factors as the desired throughput capacity, the selection of materials to be processed, etc. One preferred embodiment is illustrated in FIG. 2 wherein a coagulum reactor 48 has a mix head 50 attached to a coagulum zone 52 with a fluid-tight seal at joint 54. FIG. 2 schematically illustrates a first subsystem 56 for feeding elastomer latex to the mixing zone, subsystem 57 for feeding particulate filler fluid ("slurry") to the mixing zone, and subsystem 58 for feeding an optional additive fluid, pressurized air, etc. to the mixing zone. The mix head 50 is seen to have three feed channels 60, 61, 62. Feed channel 60 is provided for the latex fluid and feed channel 62 is provided for direct injection of gas and/or additive fluid. In connection with the preferred embodiments employing direct injection of additives, significant advantage is achieved in connection with hydrocarbon additives or, more generally, non-water miscible additives. It is well known to employ emulsion intermediates to create additive emulsions suitable for pre-blending with an elastomer latex. Preferred embodiments in accordance with the present disclosure employing direct injection of additives can eliminate not only the need for emulsion intermediates, but also the equipment such as tanks, dispersing equipment, etc. previously used in forming the emulsions. Reductions in manufacturing cost and complexity can, therefore, be achieved. As discussed further below, the feed channel 61 through which particulate filler fluid is fed to the mixing zone is preferably coaxial with the mixing zone and the coagulum zone of the coagulum reactor. While only a single feed channel is shown to receive the elastomer latex fluid, any suitable number of feed channels may be arranged around the central feed channel through which the carbon black slurry or other particulate filler fluid is fed to the mixing zone. Thus, for example, in the embodiment of FIG. 2 a fourth feed channel could be provided through which ambient air or high pressure air or other gas is fed to the mixing zone. Pressurized air may be injected likewise with the particulate filler fluid through the central axial feed channel 61. Auxiliary feed channels can be temporarily or permanently sealed when not in use.

The coagulum zone 52 of the coagulum reactor 48 is seen to have a first portion 64 which may have either a substantial or insubstantial axial length, depending upon design objectives for the particular application intended. Optionally, the coagulum zone may have a constant cross-sectional area over all or substantially all of its axial length. Thus, for example, the coagulum reactor may define a simple, straight tubular flow channel from the mixing zone to the discharge end. Preferably, however, for reasons discussed above, and as seen in the preferred embodiment illustrated in the drawings, the cross-sectional area of the coagulum zone 52 increases progressively from the entry end 66 to discharge end 68. More specifically, the cross-sectional area increases in the longitudinal direction from the entry end to the discharge end. In the embodiment of FIG. 2, the coagulum zone increases in cross-sectional area progressively in the sense that it increases continuously following constant cross-sectional portion 64. References to the diameter and cross-sectional area of the coagulum reactor (or, more properly, the coagulum zone defined within the coagulum reactor) and other components, unless stated otherwise, are intended to mean the cross-sectional area of the open flow passageway and the inside diameter of such flow passageway.

Coagulated elastomer latex in the form of masterbatch crumb 70 is seen being discharged from the coagulum reactor 48 through a diverter 70. Diverter 70 is an adjustable conduit attached to the coagulum reactor at discharge end 68. It is adjustable so as to selectively pass the elastomer masterbatch crumb 72 to any of various different receiving sites. This feature advantageously facilitates removal of masterbatch crumb from the product stream, for example, for testing or at the beginning of a production run when initial process instability may result temporarily in inferior product. In addition, the diverter provides design flexibility to direct product from the coagulum reactor to different post-processing paths. In accordance with the preferred embodiment of FIG. 1, the masterbatch crumb 72 being discharged from coagulum reactor 48 through diverter 70 is seen to be received by a drier 40.

The cross-sectional dimension of coagulum reactor 48 is seen to increase at an overall angle $\alpha$ between entry end 66 and discharge end 68. Angle $\alpha$ is greater than 0° and in preferred embodiments is less than 45°, more preferably less than 15°, most preferably from 0.5° to 5°. The angle $\alpha$ is seen to be a half angle, in that it is measured from the central longitudinal axis of the coagulum zone to a point A at the outer circumference of the coagulum zone at the end of the coagulum reactor. In this regard, it should be understood that the cross-sectional area of the upstream portion of the coagulum reactor, that is, the portion near the entry end 66, preferably increases sufficiently slowly to achieve quasi-molding of the coagulum in accordance with the principles discussed above. Too large an angle of expansion of the coagulum zone may result in the elastomer masterbatch not being produced in desirable crumb form of globules or worms and simply spraying through the coagulum reactor. Increasing the bore of the coagulum reactor too slowly can result, in certain embodiments, in backup or clogging of the feeds and reaction product into the mix head. In a downstream portion of the coagulum zone, wherein the latex has been substantially coagulated and flow has become essentially plug flow, the coagulum zone may extend either with or without increase in cross-sectional area. Thus, reference here to the coagulum zone in preferred embodiments having a progressively increasing cross-sectional area should be understood to refer primarily to that portion of the coagulum zone wherein flow is not substantially plug flow.

The cross-sectional area of the coagulum zone (that is, at least the upstream portion thereof, as discussed immediately above) may increase in step-wise fashion, rather than in the continuous fashion illustrated in the embodiment of FIG. 2. In the embodiment illustrated in FIG. 3, a continuous flow system for production of elastomer masterbatch in accordance with the method and apparatus disclosed here, is seen to include a mix head/coagulum zone assembly wherein the cross-sectional area of the coagulum zone increases in step-wise fashion. Preferably, the individual sections of the coagulum zone in such a step-wise embodiment have a faired connection to adjacent sections. That is, they combine to form a smooth and generally continuous coagulum zone surface, as opposed, for example, to a sharp or instantaneous increase in diameter from one section to the next. The coagulum zone of FIG. 3 increases in three steps, such that there are four different sections or sub-zones 74–77. Consistent with the design principles discussed immediately above, the cross-sectional area of coagulum zone 53 increases from the entry end 66 to point A at the discharge end 68 at an overall angle which achieves the necessary flow control in the upstream portion of the coagulum reactor. The first section 74 can be taken as including (a) the constant diameter portion of the mix head 50 immediately downstream of the mixing zone, and (b) the same or similar diameter portion connected thereto at joint 54 at the entry end 66. This first section has a constant cross-sectional diameter $D_1$ and an axial dimension or length $L_1$. In this first section 74 the length $L_1$ should be greater than three times the diameter $D_1$, more preferably greater than five times $D_1$, and most preferably from about 12 to 18 times $D_1$. Typically, this section will have a length of about fifteen times $D_1$. Each subsequent section preferably has a constant cross-sectional dimension and cross-sectional area approximately double that of the preceding (i.e., upstream) section. Thus, for example, section 75 has a constant cross-sectional dimension and a cross-sectional area which is twice that of section 74. Similarly, the cross-sectional area of section 76 is double that of section 75, and the cross-sectional area of section 77 is double that of section 76. In each of sections 75–77, the length is preferably greater than three times its diameter, more preferably about three to seven times its diameter and generally about five times its diameter. Thus, for example, in section 76 longitudinal dimension $L_3$ is preferably about five times its diameter $D_3$.

Figure 3:
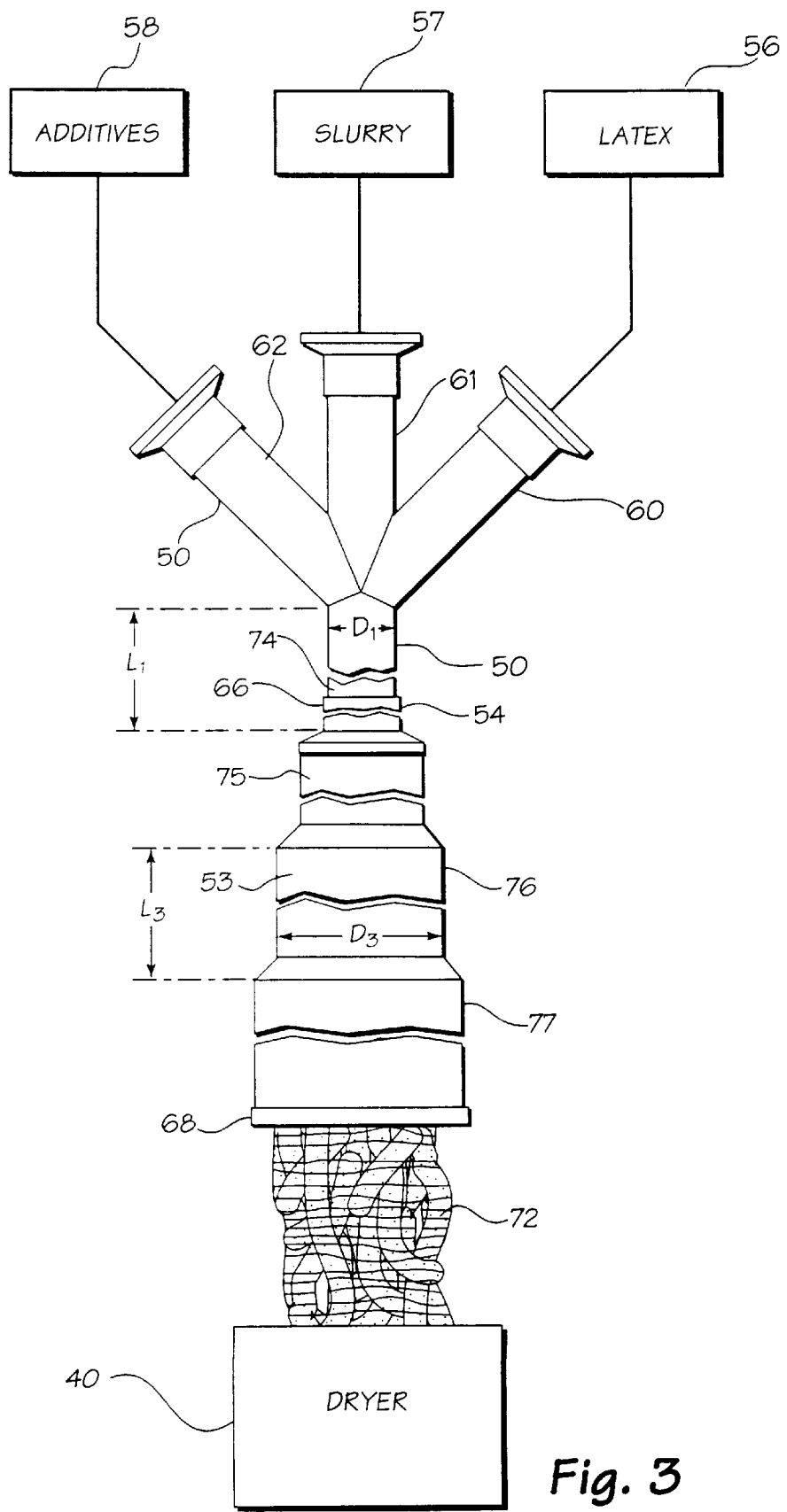
FIG. 3 is an elevation view, partially schematic, of an alternative preferred embodiment consistent with the schematic flow chart illustration of FIG. 1.
Figure 4:
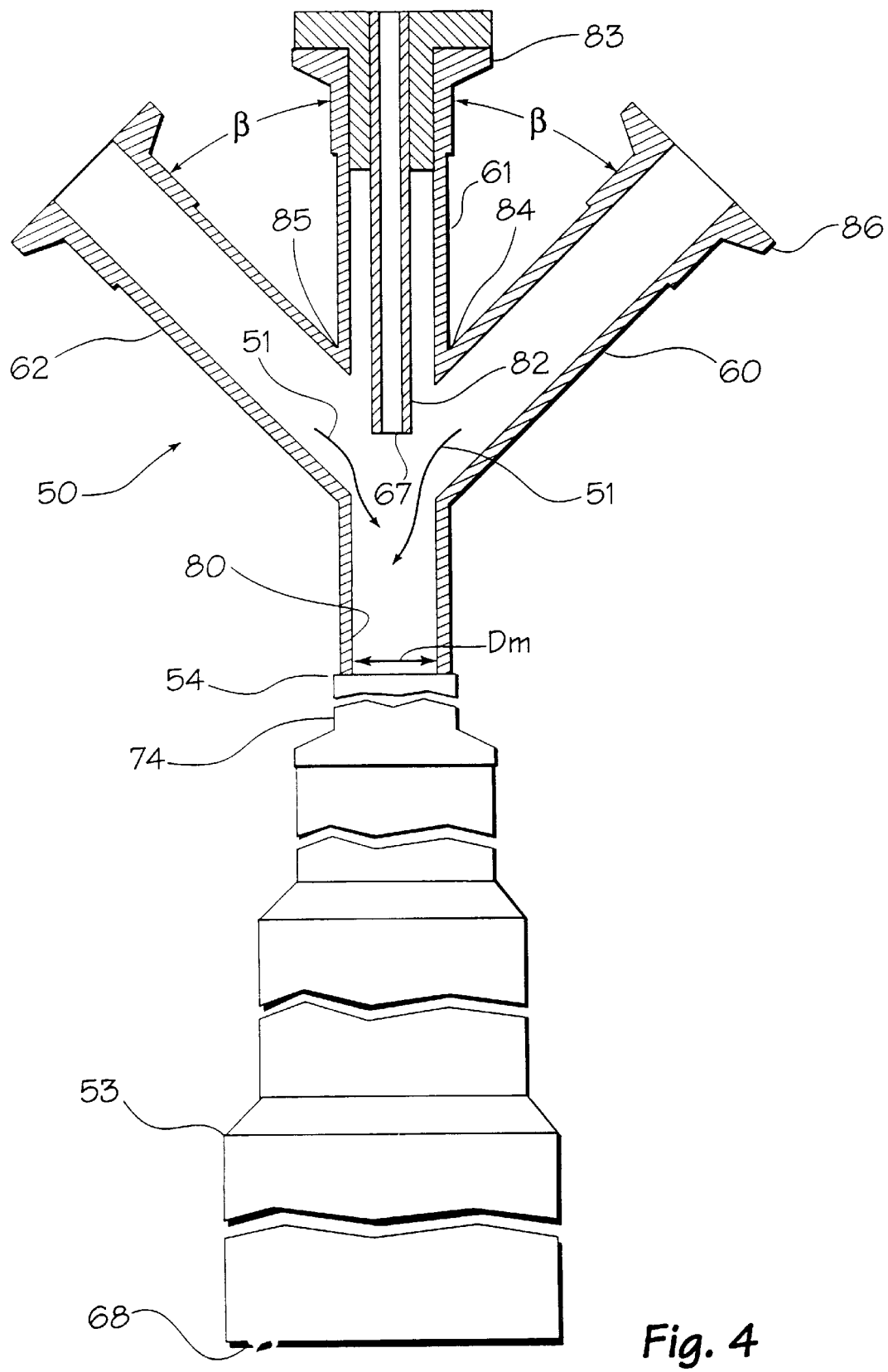
FIG. 4 is an elevation view, partially in section, of the mix head/coagulum reactor assembly of the embodiment of FIG. 3.

A mix head and coagulum zone assembly corresponding to the embodiment of FIG. 3 is shown in FIG. 4 partially in section view. Mix head 50 is integral with coagulum zone extender 53 via joint 54. It defines a mixing zone wherein multiple feed channels 60, 61, 62 form a junction, with an elongate, substantially cylindrical channel 80 substantially coaxial with the coagulum zone portion within extender 53. It will be recognized that it is not essential to the operability of the method and apparatus disclosed here, to precisely define the boundaries of the mixing zone and/or coagulum zone. Numerous variations are possible in the design of the flow channels junction area, as will be apparent to those skilled in the art given the benefit of the present disclosure. In that regard, as a generally preferred guideline, in embodiments of the type illustrated in FIG. 4, for example, the slurry tip 67 generally is upstream of the beginning of cylindrical portion 80, being approximately centered longitudinally in the junction of the feed channels. In such embodiments, preferably, the minimum cross-sectional area defined by the imaginary cone from the slurry tip 67 to the circumferential perimeter at the beginning of the cylindrical portion 80 is advantageously greater than, or at least equal to, the cross-sectional area of the latex feed channel 60. Preferably, both channel 80 and at least the upstream portion of the coagulum zone wherein flow turbulence exists prior to substantially complete coagulation of the elastomer latex, have a circular cross-section.

The means for feeding particulate filler fluid is seen to comprise a feed tube 82 extending substantially coaxially with the mixing chamber is open toward the coagulum zone. This is a highly advantageous feature of the preferred embodiments discussed here. The particulate filler fluid, as noted above, is fed to the mixing zone at very high velocity relative the feed velocity of the latex, and the axial arrangement of narrow bore feed tube 82 results in excellent development of flow turbulence. The diameter $D_m$ of the channel 80 (which, as noted above, is preferably substantially equal to the diameter $D_1$ of immediately following portion of section 74 of the coagulum zone) preferably is at least twice the inside diameter of slurry feed tube 82, more preferably about four to eight times the diameter of feed tube 82, typically about seven to eight times that diameter. Feed tube 82 is seen to form a fluid-tight seal with the entry port 83 at the upstream end of feed channel 61 of mix head 50. The diameter of the axial feed tube 82 is determined largely by the required volumetric flow rate and axial velocity of the particulate filler fluid as it passes through the nozzle tip 67 into the mixing chamber. The correct or required volume and velocity can be readily determined by those skilled in the art given the benefit of this disclosure, and will be a function, in part, of the concentration and choice of materials. Embodiments such as that illustrated and disclosed here, wherein the feed tube for the particulate filler fluid is removable, provide desirable flexibility in manufacturing different masterbatch compositions at different times. The feed tube used in one production run can be removed and replaced by a larger or smaller bore tube appropriate to a subsequent production. In view of the pressure and velocity at which the particulate filler fluid exits the feed tube nozzle, it may be referred to as a spray or jet into the mixing zone. This should be understood to mean in at least certain embodiments, high speed injection of the particulate filler fluid into an area already substantially filled with fluid. Thus, it is a spray in the sense of its immediate distribution as it passes through the nozzle, and not necessarily in the sense of free-flying material droplets in a simple spreading trajectory.

The additional feed channels 60 and 62 are seen to form a junction 84, 85, respectively, with feed channel 60 and downstream channel 80 at an angle β. The angle β may in many embodiments have a value from greater than 0° to less than 180°. Typically, β may be, for example, from 30°–90°. It is desirable to avoid a negative pressure, that is, cavitation of the latex fluid as it is entrained by the high velocity particulate filler fluid exiting at nozzle 67, since this may disadvantageously cause inconsistent mixing leading to inconsistent masterbatch product. Air or other gas can be injected or otherwise fed to the mixing zone to assist in breaking any such vacuum. In addition, an expanded feed line for the latex leading to the entry port 86 of feed channel 60 is desirable to act as a latex fluid reservoir. In the preferred embodiment of FIG. 4, latex feed channel 60 intersects the mixing zone adjacent slurry nozzle tip 67. Alternatively, however, the latex feed channel can intersect the mixing channel upstream or downstream of the nozzle 67.

The particulate filler fluid typically is supplied to feed tube 82 at a pressure above about 300 psig, such as about 500 to 5000 psig, e.g. about 1000 psig. Preferably the liquid slurry is fed into the mixing zone through the nozzle tip 67 at a velocity above 100 ft. per second, preferably about 100 to about 600 ft. per second, more preferably about 200 to 500 ft. per second, for example, about 350 feet per second. Arrows 51 in FIG. 4 represent the general direction of flow of latex and auxiliary feed materials through feed channels 60 and 62 into the channel 80 below nozzle tip 67. Thus, the slurry and latex fluids are fed to the mixing zones at greatly different feed stream velocities, in accordance with the numbers set forth above. While not wishing to be bound by theory, it presently is understood that the differential feed achieves latex shear conditions in the mixing zone leading to good dispersion and coagulation.

Figure 5:
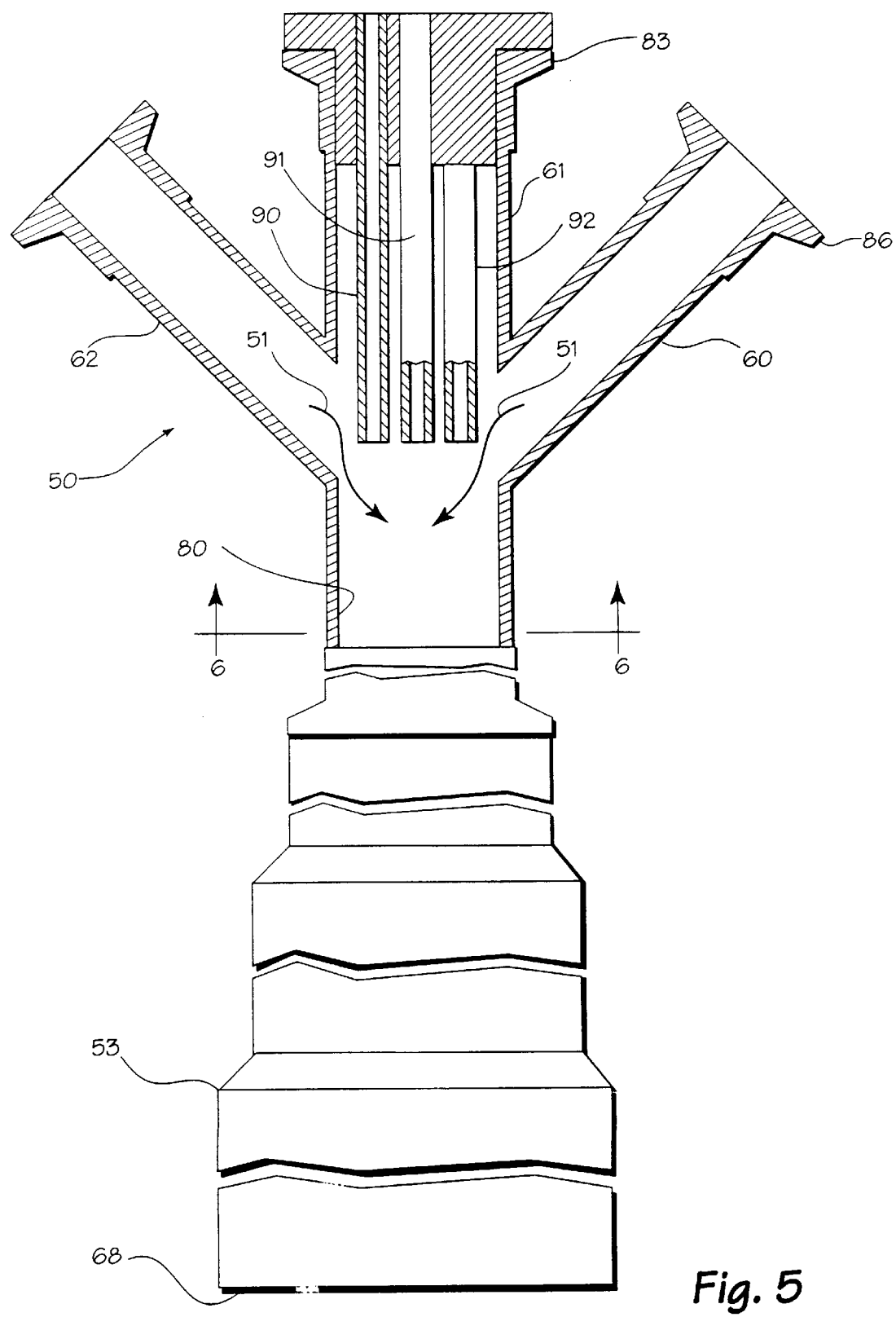
FIG. 5 is an elevation view, partially in section, corresponding to the view of FIG. 4, illustrating an alternative preferred embodiment.
Figure 6:
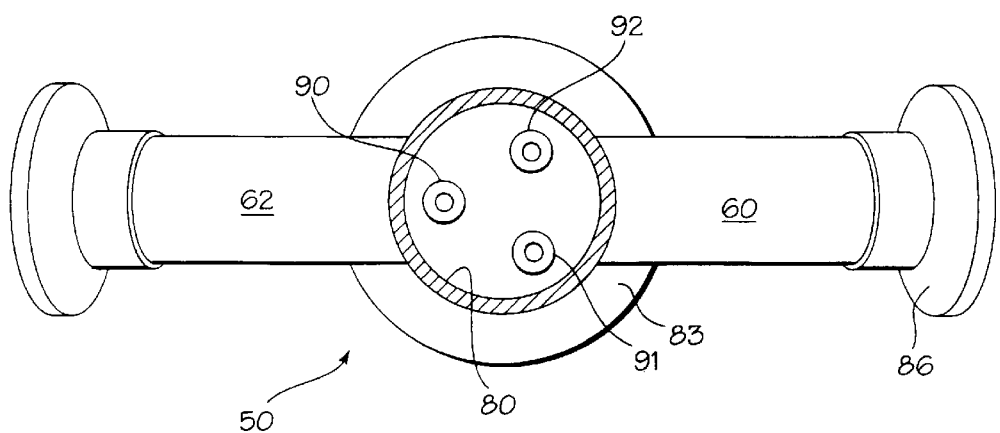
FIG. 6 is a section view taken through line 6—6 of FIG. 5.

An alternative preferred embodiment is illustrated in FIGS. 5 and 6 wherein the single axial feed tube 65 in the embodiment of FIG. 4 is replaced by multiple axially extending feed tubes 90–92. Even greater numbers of feed tubes may be employed, for example, up to about 6 or 8 axially-extending feed tubes. Advantageously, production flexibility is achieved by using different feed tubes of different diameter for production of different formulations. Also, multiple feed tubes can be used simultaneously to achieve good flow turbulence within the mixing zone and coagulum zone of the coagulum reactor.

Figure 7:
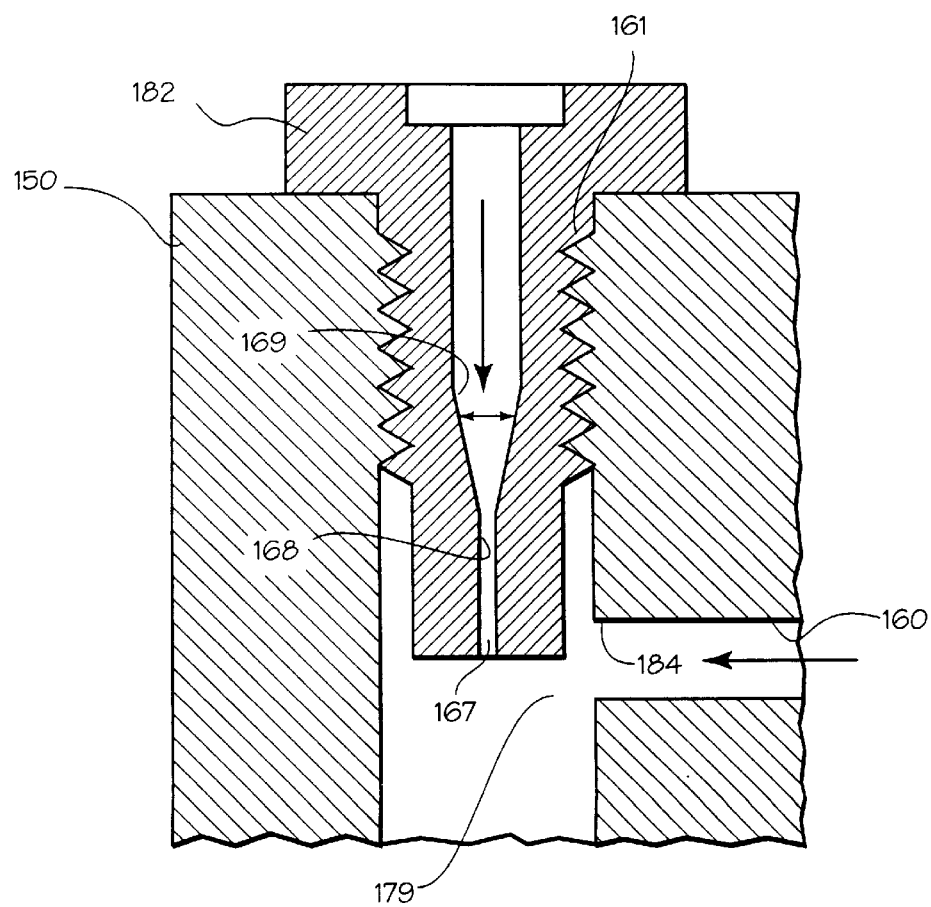
FIG. 7 is a section view of a mix head suitable for use in an alternative preferred embodiment.

An alternative embodiment of the mix head is illustrated in FIG. 7. Mix head 150 is seen to define a mixing zone 179. An axial feed channel 161 receives a feed tube 182 adapted to feed particulate filler fluid at high velocity into the mixing chamber 179. It can be seen that the central bore in feed tube 182 terminates at nozzle 167. A constant diameter nozzle land 168 is immediately upstream of nozzle tip 167, leading to a larger bore area. 169. Preferably the axial dimension of land 168 is about 2 to 6, e.g. about 5, times its diameter. A second feed channel 160 forms a junction 184 with the mixing zone 179 at a 90° angle for feeding elastomer latex fluid to the mixing zone. The cross-sectional diameter of the latex fluid feed channel 160 is substantially larger than the cross-sectional diameter of the nozzle 167 and land 168. Without wishing to be bound by theory, the axial elongation of nozzle land 168, coupled with the expanded diameter bore section upstream of the nozzle land, is believed to provide advantageous stability in the flow of particulate filler fluid through feed tube 182 into the mixing zone 179. The bore of feed tube 182 is found to function well with a 20° chamfer, that is, conical area 169 which expands in the upstream direction at about a 20° angle. Downstream of mixing zone 179 is an elongate coagulum zone 181 (shown partially broken away). Consistent with the principles discussed above, zone 181 need be only marginally elongate. That is, its axial dimension need be only marginally longer than its diameter. Preferably, however, a progressively enlarged coagulum zone is downstream of the portion 181 shown in FIG. 7.

As discussed above, coagulation of the elastomer masterbatch is substantially complete at or before the end of the coagulum reactor. That is, coagulation occurs within the coagulum zone of the coagulum reactor without the necessity of adding a stream of coagulant solution or the like. This does not exclude the possibility that some initial coagulation occurs in the mixing zone. The mixing zone may be considered an extended portion of the coagulum zone for this purpose. Also, reference to substantially complete coagulation prior to the elastomer masterbatch exiting the coagulum reactor is not meant to exclude the possibility of subsequent processing and follow-on treatment steps, for any of various purposes appropriate to the intended use of the final product. In that regard, substantially complete coagulation in preferred embodiments of the novel method disclosed here means that at least about 95 weight percent of the rubber hydrocarbon of the latex is coagulated, more preferably at least about 97 weight percent, and most preferably at least about 99 weight percent is coagulated.

The method and apparatus disclosed and described here have been used successfully to produce elastomer masterbatch having excellent physical properties and performance characteristics. Notably, elastomer masterbatch has been produced using natural rubber latex, both latex concentrate and field latex, along with various grades of carbon black filler. Carbon blacks presently in broad commercial use for such applications as tire tread have been used successfully, as well as carbon blacks heretofore considered unsuitable for such applications since their high surface area and low structure render it impractical to achieve acceptable levels of macro-dispersion at routine commercial loading levels for the carbon black and/or to preserve the molecular weight of the elastomer. Elastomer masterbatch formed in accordance with this invention are found to have excellent dispersion of the carbon black in the elastomer, together with good preservation of the molecular weight distribution of the natural rubber. Moreover, these advantageous results were achieved without the need for a coagulation step involving a treatment tank or stream of acid solution or other coagulant. Thus, not only can the cost and complexity of such coagulant treatments be avoided, so too the need to handle effluent streams from such operations.

Elastomer masterbatch produced using the methods and apparatus disclosed here, can be used in place of masterbatch produced using prior known techniques, such as mastication, etc. Thus, masterbatch produced using the methods and apparatus disclosed here can be incorporated into cured compound in accordance with known techniques. Such cured compound is found in preferred embodiments to have physical characteristics and performance properties generally comparable to, and in some instances better than, those of comparable cured compound comprising masterbatch produced using the prior known techniques. Masterbatch can be produced in accordance with the present invention, however, with reduced mixing time, reduced energy input, and/or other cost savings.

Particularly with respect to certain preferred embodiments comprising natural rubber latex and carbon black filler, masterbatch can be produced having excellent physical characteristics and performance properties. Notably, for example, excellent uniformity of carbon black dispersion can be achieved, even using carbon blacks of exceptionally high surface area and low structure, without the degree of degradation of the natural rubber which would be caused by dry mastication for sufficient time and at sufficient intensity levels to achieve the same degree of carbon black dispersion. Especially advantageous in this regard are novel natural rubber masterbatch compositions wherein a high degree of dispersion is achieved, using carbon blacks having structure to surface area ratio, $DBP:I_2No$, less than 1.2 and even less than 1.0. As used here, the carbon black structure can be measured as the dibutyl phthalate (DBP) adsorption value, expressed as cubic centimeters of DBP per 100 grams carbon black, according to the procedure set forth in ASTM D2414. The carbon black surface area can be measured as the iodine adsorption number ($I_2No$) expressed as square meters per gram of carbon black, according to the procedure set forth in ASTM D1510. Novel natural rubber masterbatch is achieved, therefore, having heretofore unachievable combinations of physical characteristics such as molecular weight distribution and filler dispersion levels, and/or incorporating heretofore unsuitable fillers such as carbon black of extraordinarily high surface area and low structure. The dispersion quality of natural rubber masterbatch produced in accordance with the methods and apparatus disclosed here can be demonstrated with reference to the well known characteristics of $MW_{sol}$ (weight average) and macro-dispersion. Specifically, the macro-dispersion level in masterbatch produced in accordance with preferred embodiments is significantly better than that in masterbatch of approximately equal $MW_{sol}$ produced using dry mastication. This dispersion quality advantage is especially significant in the above mentioned preferred embodiments using carbon black with low structure and high surface area, e.g., $DBP:I_2No$ less than 1.2 and preferably less than 1.0. Specifically, such preferred embodiments have a Cabot Dispersion Rating of A3 or better (ASTM D2663 Method). Most notably, the dispersion quality of these preferred embodiments does not depend significantly on the morphology of the carbon black filler. It will be recognized that other factors affecting the level of dispersion achievable using the method and apparatus disclosed here, include the surface area of the carbon black filler, the concentration of the carbon black in the slurry, total energy input into the slurry and energy input during mixing of the fluid streams.

EXAMPLES

Example 1

Elastomer masterbatch was produced in accordance with the present invention. Specifically, an elastomer masterbatch was produced comprising standard natural rubber field latex from Malaysia with 52.5 phr filler consisting of carbon black of commercial grade N234 available from Cabot Corporation. The properties of the natural rubber field latex are provided in Table 1 below.

TABLE 1

Natural Rubber Latex Properties

| Additives | % Dry Rubber | % Total Solids | % Ash | Nitrogen ppm | Volatile Fatty Acid | ML(1 + 4) @ 100 C. |
|---|---|---|---|---|---|---|
| 0.15% HNS[a] 0.3% NH3, ZnO, TMTD[b] | 28.4 | 34.2 | 0.38 | 0.366 | 0.052 | 68 |

[a]HNS: hydroxylamine neutral sulfate, Mooney viscosity stabilizer.
[b]ZnO/TMTD: used for biological preservation, typical 0.025% of 1:1 mixture.

The full compound formulation is set forth in Table 2 below, and is representative of a commercial truck tire tread known to have excellent resistance to reversion during cure.

TABLE 2

Masterbatch Formulation

| Ingredient | Parts by Wt. |
|---|---|
| Rubber | 100 |
| Carbon Black | 52.5 |
| ZnO | 4.0 |
| Stearic acid | 2.0 |
| 6PPD (antioxidant) | 2.0 |
| Sunproof Improved (wax) | 2.0 |
| Ennerflex 74 (aromatic oil) | 3.0 |
| Total | 165.5 |

The elastomer masterbatch production apparatus was substantially identical to the apparatus described above with reference to FIGS. 1 and 7 of the drawings. The slurry nozzle tip (see reference No. 167 in FIG. 7) was 0.039 inch diameter with a land (see reference No. 168 in FIG. 7) having an axial length of 0.2 inch. The coagulum zone (see reference No. 181 in FIG. 7) was 0.188 inch diameter and had 0.985 inch axial length of constant diameter between the mixing zone and its discharge end. Preparation of the masterbatch is described in further detail immediately below.

1. Carbon Black Slurry Preparation

Bags of carbon black were mixed with deionized water in a carbon black slurry tank equipped with an agitator. The agitator broke the pellets into fragments and a crude slurry was formed with 12.5 wt. % carbon black. During operation, this slurry was continually pumped by an air diaphragm pump to a colloid mill for initial dispersion. The slurry was then fed by a progressing cavity pump to a homogenizer, specifically, a model M3 homogenizer from APV Gaulin, Inc. The homogenizer produced a finely ground slurry. The slurry flow rate from the homogenizer to the mixing zone was set by the homogenizer speed, the homogenizer acting as a high-pressure positive displacement pump. Slurry flow rate was monitored with a Micromotion® mass flow meter. The carbon black slurry was fed to the homogenizer at a pressure ranging from 50 to 100 psig and the homogenization pressure was set at 4000 psig, such that the slurry was introduced as a jet into the mixing zone at a flow rate of 4.1 to 4.4 lb/min and at a velocity of about 130 ft/sec.

2. Latex Delivery

The latex was charged to a 100 gallon pressurized feed tank. Antioxidant emulsion was added to the latex prior to charging. Antioxidants were added consisting of 0.3 phr tris nonyl phenyl phosphite (TNPP) and 0.4 phr Santoflex® 134 (alkyl-aryl p-phenylene diamine mixture). Each of the antioxidants was prepared as a 15 wt. % emulsion using 3 parts potassium oleate per 100 parts antioxidant along with potassium hydroxide to adjust the emulsion to a pH of approximately 10. Also, 3 phr extender oil was added. Air pressure (51 psig) was used to move the latex from the feed tank to the mixing zone of the coagulum reactor. The latex flow rate was 3.2 to 3.4 lbs/min and about 3.8 feet per second, and was automatically metered and controlled with a Micromotion® mass flow meter and a rubber tube pinch valve. The desired carbon black loading of a 52.5 phr was obtained by maintaining proper ratio of the latex feed rate to the carbon black slurry feed rate.

3. Carbon Black and Latex Mixing

The carbon black slurry and latex were mixed by entraining the latex into the carbon black slurry. During entrainment, the carbon black was intimately mixed into the latex and the mixture coagulated. Soft, wet spongy "worms" of coagulum exited the coagulum reactor.

4. Dewatering

The wet crumb discharged from the coagulum reactor was about 79% water. The wet crumb was dewatered to about 5 to 10% moisture with a dewatering extruder (The French Oil Mill Machinery Company; 3½ in. diameter). In the extruder, the wet crumb was compressed and water squeezed from the crumb and through a slotted barrel of the extruder.

5. Drying & Cooling

The dewatered crumb dropped into a second extruder where it was again compressed and heated. Water was flashed off upon expulsion of the crumb through the dieplate of the extruder. Product exit temperature was approximately 300° F. and moisture content was about 0.5 to 1 wt. %. The hot, dry crumb was rapidly cooled (approximately 20 seconds) to about 100° F. by a forced air vibrating conveyor. The resulting dry crumb had about 66. wt. % rubber solids and about 33. wt. % carbon black.

Example 2

A control masterbatch was prepared by dry mastication. The control employed the same formulation as Example 1 (see Table 2 above), except that the natural rubber was SMR 10 rather than latex. It was prepared by premastication of the rubber in a OOC Banbury mixer (approximately 3 kg) at 50 rpm using 10 phr carbon black. The premastication was performed for approximately 3 min. to a total of 800 MJ/m³.

Example 3

The masterbatch of Example 1 and the control masterbatch of Example 2 were compounded in a two-stage curing operation in a OOC Banbury mixer (approximately 3 kg). Table 3 below sets forth the mixing schedule for the first stage. It can be seen that the Example 1 masterbatch followed a modified mixing schedule.

TABLE 3

| | Stage 1 Mixing Schedules | |
|---|---|---|
| Time (min) | Example 1 | Example 2 Dry Mix Control |
| 0.0 | All ingredients | Pre-Masticated Rubber |
| 0.5 | | Carbon Black and Oil |
| 1.0 | Sweep | |
| 1.5 | | Remaining Ingredients |
| 2.0 | | |
| 2.5 | | Sweep |
| 3.0 | | |
| X | dump at approx. 700 MJ/m³ | dump at approx. 1,000 MJ/m³ |

In the second stage, curatives listed in Table 4 below were added with a further mixing cycle of 500 MJ/m³.

TABLE 4

| Final Stage Curative Addition | |
|---|---|
| Ingredient | Parts by Wt. |
| Stage 1 compound | 165.5 |
| Goodyear Winstay 100 (antioxidant) | 1.0 |
| TBBS (sulfur accelerator) | 1.8 |
| Sulfur | 1.0 |
| Total | 169.3 |

Thus, Banbury mixing energy for the compounding of Example 1 masterbatch was about 53% of the Banbury mixing energy required for the premastication and compounding of the control material of Example 2. Both the Example 1 material and the control exhibited well-behaved cure with minimal reversion. Despite the reduced energy input, the Example 1 material was found to have very good macro-dispersion, and the molecular weight ($MW_{WA}$) of its sol portion was substantially higher than that of the control. These data are summarized in Table 5 below.

TABLE 5

| | Compounding and Curing Data | | | | | | | |
|---|---|---|---|---|---|---|---|---|
| | Mix Energy (MJ/m³) | | | | ML(1 + 4, 100 C.) | | MW | Dispersion |
| Sample | Pre-Masticate | Stage 1 | Final | Total | Stage 1 | Final | wt. av. | Chart |
| Example 1 | 0 | 694 | 500 | 1,194 | 102 | 72 | 444,900 | A1 |
| Control | 800 | 965 | 500 | 2,265 | 92 | 67 | 327,000 | A1-2 |

Additional testing results for the cured (unaged) Example 1 and control materials are set forth in Table 6 below.

TABLE 6

| Additional Test Data | | | | |
|---|---|---|---|---|
| Sample | Hardness | 100% Modulus | 300% Modulus | Tensile/MPa |
| Example 1 | 71 | 2.82 | 16.1 | 28.7 |
| Control | 72 | 3.12 | 16.2 | 28.5 |

| Sample | Elongation at Break | Resiliance % Mean | Heat Build-Up | Max Tan Delta | | |
|---|---|---|---|---|---|---|
| | | | | 60° C. | 30° C. | 60° C. |
| Example 1 | 526 | 56.5 | 70.5 | 0.203 | 0.240 | 0.290 |
| Control | 511 | 57.6 | 76.5 | 0.206 | 0.236 | 0.286 |

Example 4

Elastomer masterbatch was produced in accordance with the present invention. Specifically, an elastomer masterbatch was produced comprising standard natural rubber field latex from Malaysia with 55 phr filler consisting of carbon black of commercial grade Regal® 660 available from Cabot Corporation. The compound formulation (excluding minor ordinary latex additives) is set forth in Table 7 below.

TABLE 7

| Masterbatch Formulation | |
|---|---|
| Ingredient | Parts by Wt. |
| Rubber | 100 |
| Carbon Black | 55. |
| Santoflex 134 (antioxidant) | 0.4 |
| TNPP (antioxidant) | 0.3 |
| Total | 155.7 |

The elastomer masterbatch production apparatus was substantially identical to the apparatus described above with reference to FIGS. 1, 3 and 7 of the drawings. The slurry nozzle tip (see reference No. 167 in FIG. 7) was 0.025 inch diameter with a land (see reference No. 168 in FIG. 7) having an axial length of 0.2 inch. The coagulum zone (see No. 53 in FIG. 3 and No. 181 in FIG. 7) included a first portion of 0.188 inch diameter and approximately 0.985 inch axial length (being partly within the mix-head and party within the extender sealed thereto); a second portion of 0.266 inch diameter and 1.6 inch axial length; a third portion of 0.376 inch diameter and 2.256 axial length; and a fourth portion of 0.532 inch diameter and 3.190 inch axial length. In addition, there are axially short, faired interconnections-between the aforesaid portions. Preparation of the masterbatch is described in further detail immediately below.

1. Carbon Black Slurry Preparation

Bags of carbon black were mixed with deionized water in a carbon black slurry tank equipped with an agitator. The agitator broke the pellets into fragments and a crude slurry was formed with 14.9 wt. % carbon black. During operation, this slurry was continually pumped by an air diaphragm pump to a colloid mill for initial dispersion. The slurry was then fed by a progressing cavity pump to a homogenizer, specifically, Microfluidizer Model M210 from Microfluidics International Corporation. The homogenizer produced a finely ground slurry. The slurry flow rate from the homogenizer to the mixing zone was set by the homogenizer speed, the homogenizer acting as a high-pressure positive displacement pump. Slurry flow rate was monitored with a Micromotion® mass flow meter. The carbon black slurry was fed to the homogenizer at a pressure of about 130 psig and the homogenizer output pressure was set at 3000 psig to an accumulator set at 450 psig output pressure, such that the slurry was introduced as a jet into the mixing zone at a flow rate of about 3.9 lb/min and at a velocity of about 300 ft/sec.

2. Latex Delivery

The latex was charged to a 100 gallon feed tank. Antioxidant emulsion was added to the latex prior to charging. Antioxidants were added consisting of 0.3 phr tris nonyl phenyl phosphite (TNPP) and 0.4 phr Santoplex® 134 (alkyl-aryl p-phenylene diamine mixture). Each of the antioxidants was prepared as a 40 wt. % emulsion using 4 parts potassium oleate per 100 parts antioxidant along with potassium hydroxide to adjust the emulsion to a pH of approximately 10. A peristaltic pump was used to move the latex from the feed tank to the mixing zone of the coagulum reactor. The latex flow rate was 3.2 to 3.3 lbs/min and about 3.9 feet per second, and was metered with a Micromotion® mass flow meter. The desired carbon black loading of a 55 phr was obtained by maintaining proper ratio of the latex feed rate to the carbon black slurry feed rate.

3. Carbon Black and Latex Mixing

The carbon black slurry and latex were mixed by entraining the latex into the carbon black slurry. During entrainment, the carbon black was intimately mixed into the latex and the mixture coagulated. Soft, wet spongy "worms" of coagulum exited the coagulum reactor.

4. Dewatering

The wet crumb discharged from the coagulum reactor was about 78% water. The wet crumb was dewatered to about 12 to 13% moisture with a dewatering extruder (The French Oil Mill Machinery Company; 3½ in. diameter). In the extruder, the wet crumb was compressed and water squeezed from the crumb and through a slotted barrel of the extruder.

5. Drying & Cooling

The dewatered crumb dropped into a second extruder where it was again compressed and heated. Water was flashed off upon expulsion of the crumb through the dieplate of the extruder. Product exit temperature was approximately 280° F. to 370° F. and moisture content was about 0.3 to 0.4 wt. %. The hot, dry crumb was rapidly cooled (approximately 20 seconds) to about 100° F. by a forced air vibrating conveyor.

Examples 5 and 6

Two dry mix control masterbatches were prepared by dry mastication. The controls employed the same formulation as Example 4 (see Table 7 above), except that in Example 5 the rubber was RSS1 NR rather than latex. In Example 6 the rubber was SMR 10 NR. Each was prepared by premastication of the rubber in a BR Banbury mixer. The rubber of Example 5 was masticated at 118 rpm for 10 minutes. The rubber of Example 6 was masticated at 77 rpm for 4 minutes.

Example 7

The masterbatch of Example 4 and the two control masterbatches of Example 5 and 6 were compounded in a BR Banbury mixer. Table 8 below sets forth the compounding schedules.

TABLE 8

Compounding Schedules

| Masterbatch | Pre-Mastication | Stage I Mixing | Stage II (Final) Mixing |
|---|---|---|---|
| Example 4 | No | No | BR Banbury 77 rpm, 4.5 min. |
| Example 5 | BR Banbury mixer 118 rpm, 10 min. | BR Banbury mixer 77 rpm, 3 min. | BR Banbury 77 rpm, 4.5 min. |
| Example 6 | BR Banbury mixer 77 rpm, 4 min. | BR Banbury mixer 77 rpm, 8 min. | BR Banbury 77 rpm, 4.5 min. |

The compounding formulation is given in Table 9 below.

TABLE 9

Stage II Curative Addition

| Ingredient | Parts by Wt. |
|---|---|
| Example 4 Masterbatch or Example 5 or 6 Stage 1 Dry Mix | 155 |
| Azo 66 (zinc oxide) | 4.0 |
| Hystrene 5016 (stearic acid) | 2.0 |
| Santoflex 13 (antioxidant) | 2.0 |
| Sunproof Improved (wax) | 2.0 |
| Wingstay 100 (antioxidant) | 1.0 |
| Santocure NS (sulfur accelerator) | 1.8 |
| Sulfur | 1.0 |
| Total: | 168.8 |

All three compounds exhibited well-behaved cure with minimal reversion. Despite the reduced energy input, the Example 4 material was found to have significantly better macro-dispersion than the dry mix controls, and the molecular weight ($MW_{WA}$) of its sol portion was substantially higher than that of the controls. These data are summarized in Table 10 below.

TABLE 10

Masterbatch and Compound Properties

| | Example 4 | Example 5 | Example 6 |
|---|---|---|---|
| Masterbatch Properties | | | |
| Mooney Viscosity ML(1 + 4)@100 C. | 125 | 124 | 126 |
| Bound Rubber (%) | 50 | 32 | 44 |
| MW sol (× 10⁻⁶) | 0.678 | .466 | .463 |
| % Undispersed Area | .12 | 1.48 | 2.82 |
| Cabot Dispersion Rating | A3 | C6 | D6 |
| Compound Properties | | | |
| Hardness | 62 | 65 | 62 |
| 100% Modulus (psi) | 239 | 315 | 270 |
| 300% Modulus (psi) | 1087 | 1262 | 1216 |
| Tensile strength (psi) | 4462 | 4099 | 4344 |
| Elongation, % | 675 | 591 | 600 |

TABLE 10-continued

Masterbatch and Compound Properties

|  | Example 4 | Example 5 | Example 6 |
|---|---|---|---|
| Max. Tan Delta @ 60 C. (Strain Sweep) | 0.189 | .237 | .184 |
| Crack Growth Rate (cm/per million cycles) | 0.8 | 5.0 | 5.8 |

Test Procedures

1. Bound Rubber

A sample weighing 0.5 g.±0.025 g. is weighed and placed in 100 ml. toluene in a sealed flask and stored at ambient temperature for approximately 24 hours. The toluene is then replaced with 100 ml. fresh toluene and the flask is stored for 4 days. The sample is then removed from the solvent and air-dried under a hood at ambient temperature for 24 hours. The sample is then further dryed in a vacuum oven at ambient temperature for 24 hours. The sample is then weighed and the bound rubber is calculated from the weight loss data.

2. Molecular Weight Distribution

Standard GPC techniques for molecular weight measurement were followed in accordance with the following:

2.1 Two 10 $\mu$m $10^6$ Å columns, a 10 $\mu$m 500 Å column and a 10 $\mu$m mixed bed column from Polymer Laboratories, UK.

2.2 UV detection at 215 nm.

2.3 Solvent: Tetra hydro furan (THF)

2.4 Concentration, nominally 2 mg/ml in THF.

2.5 Samples are left to dissolve in THF for 3 days, stabilized with BHT.

2.6 Solutions are centrifuged to separate any gel and the supernatant is injected onto the column.

3. Mooney Viscosity

Standard procedures were followed for ML (1+4)@100° C.

4. Test Sample Cure Conditions

Test pieces were cured to 150° C. for the time periods indicated below:

4.1 Tensile Sheet: 20 min.

4.2 Resilience: 23 min.

4.3 Hardness: 23 min.

4.4 Heat Build-Up: 25 min.

5. Dispersion

The Cabot Dispersion Chart method is used with subjective evaluation of 50× optical micrographs. (ASTM D2663 Method).

6. Stress-Strain

Tested to BS903:A2 and ISO 37.

7. Hardness

Tested to ISO 48 (1994), temperature 23° C.

8. Resilience

Tested to BS903:A8 (1990), Method A, temperature 23° C. (8 mm molded disc test piece).

9. Heat Buildup

Tested to ASTM D623, Method A.

9.1 Start temperature: 23° C.

9.2 Static load: 24 lbs.

9.3 Stroke: 0.225 inches.

9.4 Frequency: 30 Hz.

9.5 Run for 30 minutes.

10. Tan δ

Measured on Rheometrics® model RDS II. Reported values are maximums from strain sweeps. Strain sweeps at 0°, 30°, and 60° C., 1 Hz, and 0.1% to 60% strain.

In view of the foregoing disclosure, it will be apparent to those skilled in the art that various additions, modifications, etc. can be made without departing from the true scope and spirit of the invention. All such additions and modifications are intended to be covered by the following claims.

We claim:

1. A method of producing elastomer masterbatch, comprising:

feeding a continuous flow of first fluid comprising elastomer latex to a mixing zone of a coagulum reactor defining an elongate coagulum zone extending from the mixing zone to a discharge end;

feeding a continuous flow of second fluid comprising particulate filler under pressure to the mixing zone of the coagulum reactor to form a mixture with the elastomer latex, the mixture passing as a continuous flow to the discharge end and the particulate filler being effective to coagulate the elastomer latex, wherein feeding of the second fluid against the second fluid within the mixing zone is sufficiently energetic to substantially completely coagulate the elastomer latex with the particulate filler prior to the discharge end; and discharging a substantially continuous flow of elastomer masterbatch from the discharge end of the coagulum reactor.

2. The method of producing elastomer masterbatch in accordance with claim 1 wherein the second fluid is fed to the mixing zone through a nozzle at a velocity of 100 to 600 feet per second.

3. The method of producing elastomer masterbatch in accordance with claim 2 wherein the first fluid is fed continuously into the mixing zone at a velocity lower than 12 feet per second.

4. The method of producing elastomer masterbatch in accordance with claim 1 wherein the elastomer latex is natural rubber latex and the particulate filler is carbon black.

5. The method of producing elastomer masterbatch in accordance with claim 1 further comprising feeding an auxiliary fluid to the mixing zone, the auxiliary fluid being substantially non-reactive with the mixture.

6. The method of producing elastomer masterbatch in accordance with claim 5 wherein the auxiliary fluid is air.

7. The method of producing elastomer masterbatch in accordance with claim 1 wherein the coagulum zone has progressively increasing cross-sectional area.

8. A continuous flow method of preparing elastomer masterbatch of particulate filler dispersed in elastomer, comprising:

A) establishing a continuous, semi-confined flow of combined elastomer latex and particulate filler under pressure in a coagulum reactor forming an elongate coagulum zone extending with progressively increasing cross-sectional area from an entry end to a discharge end, by simultaneously (i) feeding elastomer latex fluid continuously to a mixing zone at the entry end of the coagulum reactor, and (ii) entraining the elastomer latex fluid into particulate filler fluid by feeding the particulate filler fluid as a continuous jet into the mixing zone sufficiently energetically against the elastomer latex fluid to substantially completely coagulate the elastomer latex with the particulate filler; and B) discharging from the discharge end of the coagulum reactor a substantially constant flow of elastomer masterbatch globules concurrently with feeding of the fluid streams in accordance with steps A(i) and A(ii).

9. The continuous flow method of producing elastomer masterbatch in accordance with claim 8 wherein coagulation of the elastomer latex is substantially complete in the elastomer masterbatch globules as they are discharged from the discharge end of the coagulum reactor.

10. The continuous flow method of producing elastomer masterbatch in accordance with claim 8 further comprising the step of preparing the particulate filler fluid by high energy dispersion of the particulate filler in a liquid in a homogenizer having an outlet port in fluid communication with the mixing zone.

11. The continuous flow method of producing elastomer masterbatch in accordance with claim 8 wherein the liquid slurry is fed into the mixing zone through a nozzle at a velocity of 100 to 600 feet per second.

12. The continuous flow method of producing elastomer masterbatch in accordance with claim 11 wherein the velocity of the liquid slurry through the nozzle is from 200 to 500 feet per second.

13. The continuous flow method of producing elastomer masterbatch in accordance with claim 8 further comprising the step of premixing minor amounts of additives into the elastomer latex prior to feeding the elastomer latex to the mixing zone.

14. The continuous flow method of producing elastomer masterbatch in accordance with claim 8 wherein the particulate filler fluid is an aqueous carbon black dispersion.

15. The continuous flow method of producing elastomer masterbatch in accordance with claim 8 wherein the particulate filler fluid comprises particulate filler selected from the group consisting of silicon treated carbon black, fumed silica, precipitated silica, and mixtures of any of them.

16. The continuous flow method of preparing elastomer masterbatch in accordance with claim 8 wherein the elastomer latex fluid consists essentially of natural rubber latex.

17. The continuous flow method of preparing elastomer masterbatch in accordance with claim 16 wherein the natural rubber latex is natural rubber latex concentrate.

18. The continuous flow method of preparing elastomer masterbatch in accordance with claim 16 wherein the natural rubber latex is field latex.

19. The continuous flow method of producing elastomer masterbatch in accordance with claim 8 further comprising mixing additive to the semi-confined flow by separately feeding an additive fluid continuously to the mixing zone simultaneously with the elastomer latex fluid and the particulate filler fluid.

20. The continuous flow method of producing elastomer masterbatch in accordance with claim 8 wherein the additive is selected from antiozonants, antioxidants, plasticizers, processing aids, resins, flame retardants, extender oils, lubricants, and mixtures of any of them.

21. The continuous flow method of producing elastomer masterbatch in accordance with claim 8 further comprising injecting pressurized gas into the mixing zone.

22. The continuous flow method of producing elastomer masterbatch in accordance with claim 21 wherein the pressurized gas is injected separately into the mixing zone.

23. The continuous flow method of producing elastomer masterbatch in accordance with claim 22 wherein the pressurized gas is injected into the mixing zone through a nozzle together with the particulate filler fluid.

24. The continuous flow method of producing elastomer masterbatch in accordance with claim 8 wherein step A(ii) comprises feeding multiple streams of particulate filler fluid to the mixing zone continuously through multiple nozzles.

25. The continuous flow method of producing elastomer masterbatch in accordance with claim 8 further comprising, simultaneously with steps A(i) and A(ii), feeding at least one auxiliary stream of elastomer latex fluid to the mixing zone.

26. The continuous flow method of producing elastomer masterbatch in accordance with claim 8 further comprising the step of drying the elastomer masterbatch globules received from the discharge end of the coagulum reactor, through a series of multiple dryers.

27. The continuous flow method of producing elastomer masterbatch in accordance with claim 26 further comprising the step of baling the elastomer masterbatch by sequentially compressing 25 to 75 pound quantities of the elastomer masterbatch after the drying step.

28. The continuous flow method of producing elastomer masterbatch in accordance with claim 8 wherein the elastomer latex fluid is fed under pressure less than 10 psig and the particulate filler fluid is fed under pressure of at least 75 psig.

29. A continuous flow method of producing rubber masterbatch by coagulating natural rubber latex with carbon black, comprising:
   A) establishing a continuous, semi-confined flow of mixed natural rubber latex and carbon black in a coagulum reactor forming a generally tubular coagulum zone extending with progressively increasing cross-sectional area from an entry end to an open discharge end, by simultaneously
      (i) feeding a liquid stream of the natural rubber latex continuously to a mixing zone at the entry end of the coagulum reactor, and
      (ii) entraining the natural rubber latex continuously into a liquid slurry of the carbon black by feeding the liquid slurry as a continuous jet into the mixing zone; and
   B) simultaneously discharging rubber masterbatch globules from the discharge end of the coagulum reactor.

30. A continuous flow method of producing elastomer masterbatch comprising particulate filler selected from carbon black, silicon-treated carbon black, fumed silica, precipitated silica, and mixtures thereof finely dispersed in natural rubber, comprising:
   preparing a particulate filler fluid by high energy dispersion of the particulate filler into aqueous liquid in a homogenizer; and
   establishing a continuous, semi-confined flow of mixed natural rubber latex and particulate filler in a coagulum reactor forming a generally tubular coagulum zone extending with progressively increasing cross-sectional area from an entry end to a discharge end by simultaneously
      (i) feeding a liquid stream of the natural rubber latex at less than 10 feet per second continuously to a mixing zone defined by a mix head in sealed fluid communication with the entry end of the coagulum reactor, the mixing zone extending coaxially with the coagulum zone, and
      (ii) entraining the natural rubber latex continuously into the particulate filler fluid by feeding the particulate filler fluid into the mixing zone toward the entry end of the coagulum zone, through a feed tube substantially coaxial with the coagulum zone, the particulate filler fluid exiting the feed tube at a velocity of 200 to 500 feet per second;
   simultaneously and continuously discharging from the discharge end of the coagulum reactor masterbatch globules in which coagulation of the natural rubber latex by the particulate filler is substantially complete; and
   simultaneously and continuously drying and pelletizing masterbatch globules discharged from the coagulum reactor in a series of dryers.

* * * * *